US012657175B2

(12) United States Patent
Bosch et al.

(10) Patent No.: US 12,657,175 B2
(45) Date of Patent: Jun. 16, 2026

(54) SYSTEMS AND METHODS FOR PROCESSING TIMESERIES DATA

(71) Applicant: MongoDB, Inc., New York, NY (US)

(72) Inventors: Geert Bosch, Brooklyn, NY (US);
Henrik Edin, Portsmouth, NH (US);
Pawel Terlecki, Miami, FL (US);
David Percy, New York, NY (US);
Daniel Larkin-York, Saint Petersburg,
FL (US)

(73) Assignee: MongoDB, Inc., New York, NY (US)

( * ) Notice: Subject to any disclaimer, the term of this
patent is extended or adjusted under 35
U.S.C. 154(b) by 0 days.

(21) Appl. No.: 18/358,238

(22) Filed: Jul. 25, 2023

(65) Prior Publication Data

US 2023/0367752 A1 Nov. 16, 2023

Related U.S. Application Data

(63) Continuation-in-part of application No. 17/858,950,
filed on Jul. 6, 2022, now abandoned.

(60) Provisional application No. 63/392,457, filed on Jul.
26, 2022, provisional application No. 63/220,332,
filed on Jul. 9, 2021.

(51) Int. Cl.
*G06F 16/22* (2019.01)
*G06F 16/2455* (2019.01)
*G06F 16/2458* (2019.01)

(52) U.S. Cl.
CPC ...... *G06F 16/221* (2019.01); *G06F 16/24568*
(2019.01); *G06F 16/2477* (2019.01)

(58) Field of Classification Search
CPC .................................................... G06F 16/221
USPC ........................................................ 707/791
See application file for complete search history.

(56) References Cited

U.S. PATENT DOCUMENTS

| | | | |
|---|---|---|---|
| 11,010,223 B2 | 5/2021 | Dasgupta et al. | |
| 12,038,926 B1 * | 7/2024 | Pathak ................ | G06F 16/2228 |
| 2007/0255758 A1 | 11/2007 | Zheng et al. | |
| 2012/0109985 A1 | 5/2012 | Chandrasekaran | |
| 2017/0262517 A1 * | 9/2017 | Horowitz .............. | G06F 16/258 |

(Continued)

FOREIGN PATENT DOCUMENTS

| | | | | | |
|---|---|---|---|---|---|
| CN | 111626623 A | * | 9/2020 | ............... | E21D 9/08 |
| CN | 112307177 A | * | 2/2021 | ......... | G06F 16/3329 |
| CN | 113518081 A | | 10/2021 | | |

OTHER PUBLICATIONS

Jeong et al. A data management infrastructure for bridge monitoring. Proceedings vol. 9435, Sensors and Smart Structures Technologies for Civil, Mechanical and Aerospace Systems 2015; 94350P (2015). pp. 1-16 (Year: 2015).

(Continued)

*Primary Examiner* — Syling Yen

(74) *Attorney, Agent, or Firm* — Wolf, Greenfield & Sacks, P.C.

(57) ABSTRACT

A system is provided for storing, in a database, a plurality of timeseries represented by a plurality of respective documents events in a columnar format. The system further is adapted compress at least one of the values within the plurality of documents. According to some embodiments, the system stores the compressed values as a Simple-8b block and calculates the optimal Simple-8b selector. According to some embodiments, the system is adapted to determine a secondary index based on values within the bucket.

19 Claims, 27 Drawing Sheets

(56)               References Cited

U.S. PATENT DOCUMENTS

| | | |
|---|---|---|
| 2018/0232459 A1 | 8/2018 | Park et al. |
| 2018/0300381 A1 | 10/2018 | Horowitz et al. |
| 2019/0087696 A1 | 3/2019 | Verhoeven et al. |
| 2020/0372004 A1 * | 11/2020 | Barber ...................... G06F 7/08 |
| 2020/0387509 A1 | 12/2020 | Florendo |
| 2021/0034598 A1 | 2/2021 | Arye |
| 2021/0406528 A1 | 12/2021 | Ramani et al. |
| 2022/0067980 A1 | 3/2022 | Kletter |
| 2023/0037619 A1 | 2/2023 | Terlecki et al. |
| 2023/0040530 A1 | 2/2023 | Terlecki et al. |
| 2023/0041129 A1 | 2/2023 | Terlecki et al. |
| 2023/0367781 A1 | 11/2023 | Bosch et al. |
| 2023/0367801 A1 | 11/2023 | Bosch et al. |

OTHER PUBLICATIONS

MongoDB Manual, https://www.mongodb.com/docs/v4.4 pp. 1-122 (Year: 2020).

Qi M. Digital Forensics and NoSQL Databases, 2014 11th International Conference on Fuzzy Systems and Knowledge Discovery pp. 1-6 (Year: 2014).

* cited by examiner

```
{ _id: ObjectId(...),
  control: {
   version: 1, // to support versioning
   min: { _id: ..., time: ISOdate("2020-09-09T16:54.04.174Z"), field0: 0.01, ... },
   max: { _id: ..., time: ISOdate("2020-09-09T16:54.04.450Z"), field0: 0.99, ... },
  },
  meta: ...
  data: { _id: { 0: ..., 1: ..., ...},
       time: { 0: ISODate("2020-09-09T16:54:04.174Z"),
            1: ISODate("2020-09-09T16:54:04.450Z"), ...},
       field0: { 0: 0.99, 1: 0.01,...},
       field1: { 2: "high", 42: "low",...}, // Missing fields are omitted
       ...}
}
```

FIG. 2

Process
*500*

*501*
Begin

*502*
Identify Which
Columns to Unpack

*503*
Inspect Metadata Fields
on Include List, Populate
Output Document with
Metadata Fields

*504*
Get Current Row
Key and Timestamp

*505*
Loop Over Bucket
to Unpack Measurements

*506*
For Each Timestamp
and Column, Add
to Output Document

*507*
End

Process
600

601

Begin

602

Determine Window Bounds
for Timeseries Data in Terms
of Time and/or Documents

603

Based on Aggregation Operator and
Value(s), Determine Output Documents

604

End

Process
*1100*

*1101*

Begin

*1102*

Identify Group of Related Timeseries
Measurements Across Documents

*1103*

Determine Delta Compression
Across Related Measurements

*1104*

Compress Scalar Values

*1105*

Store Result

*1106*

End

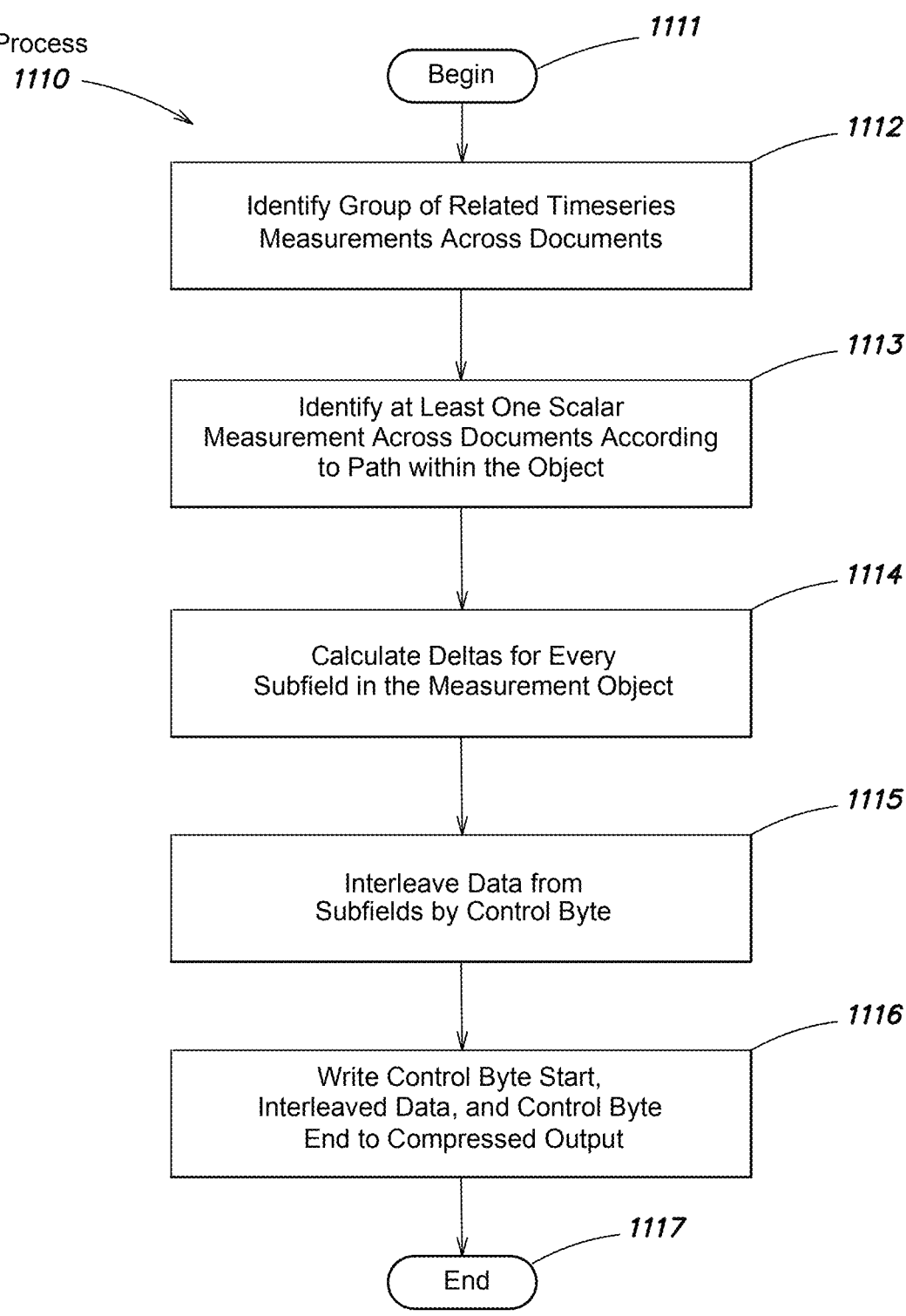

Process
*1110*

*1111*
Begin

*1112*
Identify Group of Related Timeseries
Measurements Across Documents

*1113*
Identify at Least One Scalar
Measurement Across Documents According
to Path within the Object

*1114*
Calculate Deltas for Every
Subfield in the Measurement Object

*1115*
Interleave Data from
Subfields by Control Byte

*1116*
Write Control Byte Start,
Interleaved Data, and Control Byte
End to Compressed Output

*1117*
End

*FIG. 11B*

Process
*1200*

*1201*

Begin

*1202*

Create Timeseries Measurements
Across Documents Database

*1203*

Determine Index for Bucket
Collection of Timeseries Documents

*1204*

Store Index

*1205*

End

Computer
Readable Medium          *1502*

Memory

*1504*

Storage Device

*1412*

2300

2320 2310

RLE
count    selector
(4 bits)    value 15

2330 unused
(56 bits)

0

4

8

63

2500

2502

2504

{a: {b: {c: 1}, d: 1}}
{a: {b: {c: 2}, d: 3, e: 2}}

2510    2520    2530    2540    2550    2560    2570

| 0xF0 | Ref-object | Δc: [0, 1] | Δd: [0, 2] | Δe: [skip, 0] | EOO | EOO |

2506

An ordering of scalar fields: c, d, e
With reference object: {a: {b: {c: 1}, d: 1, e: 2}}

2508

SYSTEMS AND METHODS FOR PROCESSING TIMESERIES DATA

NOTICE OF MATERIAL SUBJECT TO COPYRIGHT PROTECTION

CROSS-REFERENCE TO RELATED APPLICATIONS

This application claims priority under 35 U.S.C. § 120 to and is a Continuation-In-Part of U.S. patent application Ser. No. 17/858,950, filed Jul. 6, 2022, entitled "SYSTEMS AND METHOD FOR PROCESSING TIMESERIES DATA", which claims priority under 35 U.S.C. § 119 (c) to U.S. Provisional Application Ser. No. 63/220,332 filed Jul. 9, 2021, entitled "SYSTEMS AND METHOD FOR PROCESSING TIMESERIES DATA". This Application also claims priority under 35 U.S.C. 119 (c) to and is a Non-Provisional of U.S. Provisional Application Ser. No. 63/392,457, filed Jul. 26, 2022, entitled "SYSTEMS AND METHODS FOR PROCESSING TIME SERIES DATA". The entire contents of these applications are incorporated herein by reference in their entirety.

SUMMARY

According to some aspects described herein, it is appreciated that it would be useful to be able to store timeseries data in a non-relational database format. Timeseries information is used by a number of systems for recording data retrieved over time, such is done in multiple types of systems/industries such as the Internet of Things (IoT), manufacturing, utilities, energy, retail, advertising, E-commerce, financial services, banking, stock brokerages, among others that store and analyze data over time.

Historically, nonrelational database formats such as those provided by MongoDB include NoSQL formats which were previously non-conducive for storing timeseries collections, as many of these formats are based upon documents, not time. Conventionally, timeseries data would be stored natively in an SQL database format or converted to such a format to perform SQL-like functions. In some embodiments described herein, event data may be stored in a data structure defined by documents. It is appreciated also that other document-based databases or other database formats may be modified to or suitably use timeseries information.

In some implementations, events measured at various points in time may be organized in a data structure that defines an event represented by a document. In particular, events can be organized in columns of documents referred to as buckets. These buckets may be indexed using B-trees by addressing metadata values or value ranges. Buckets may be defined by periods of time. Documents may also be geo-indexed and stored in one or more locations in a distributed computer network. One or more secondary indexes may be created based on time and/or metadata values within documents.

In some embodiments, it is appreciated that timeseries data can become quite large, especially for data recorded over time and with large frequencies. According to some embodiments, it is appreciated that various compression techniques may be used to compress column-based timeseries data. In some embodiments, several different techniques may be flexibly used to compress timeseries information stored as documents in a document database.

In some embodiments, floating point data may be stored more efficiently by performing scaling of a floating-point value and rounding to an integer. In some embodiments, Simple-8b may be used to encode the adjusted floating-point values. In some embodiments, negative numbers may be stored more efficiently (e.g., using Simple 8-b encoding) by, in some embodiments, mapping signed integers to unsigned integers (e.g., using Google ZigZag encoding). Typically, integers are represented using two's complement, but this operation requires sign extension. In some embodiments, ZigZag encoding may be used, and because ZigZag encoding stores sign in a least significant bit, sign extension is not needed, and the encoding works well with different widths and therefore ZigZag encoding works well with Simple-8b encoding. Also, in some embodiments, if it appreciated that there may be optional or missing fields within timeseries documents, so approaches may be provided to efficiently encode optional and/or missing fields.

In some embodiments, database elements may be transformed into integers to more efficiently store data in a single binary format (e.g., using delta encoding in a Simple-8b format, delta encoding being used to reduce the number of bits stored, and Simple-8b encoding being used to pack as many values into a single 64 bit block). In some implementations, Simple-8b techniques may be extended to efficiently store integers with trailing zeroes by using unused bits of some selectors. In some embodiments, the number of elements within a block may be determined by inspecting a byte in the Simple-8b, reducing the time needed for lookups. Further, in some embodiments, compression of complex objects is provided that permits compression across objects that represent a group of measurements. In some embodiments, multiple measurements may be encoded as a single integer.

In some embodiments, such approaches may be used to compress one or more BSON elements, which is a data storage format used by a MongoDB database server. BSON elements are binary encoded JavaScript Object Notation (JSON) which is a textual object notation used to transmit and store data across web applications. In some embodiments, it is appreciated that the BSON format used by the MongoDB Database server contains multiple data types each with a different binary format. To be able to use the techniques described above, the BSON elements may be transformed into a signed integer so that they may be compressed (e.g., by calculating deltas) and store the elements in Simple-8b. In some embodiments, the system may use a per-type transformation that puts as much entropy in the least significant bytes as possible so the calculated delta will be as small as possible.

In some embodiments, it is appreciated that different types of indexes may be generated on timeseries measurements (e.g., indexes for documents) that enable various query functions and provide more efficient searching. For example, in some embodiments, ascending and/or descending indexes may be provided for various timeseries collection measurement fields of a buckets collection. In some embodiments, geo-type indexes may be provided that permit geo type searching of documents within a buckets collection. Further, in some embodiments, the system may provide support for compound indexes of different types.

According to one aspect a system is provided. The system comprises a database engine configured to store, in a database, a plurality of timeseries events as a plurality of documents within a bucket, the database engine being further configured to: store, in a columnar format, the plurality of timeseries events represented by the plurality of respective documents, wherein the act of storing includes compressing at least one of a series of data values among the plurality of documents within the bucket. According to one embodiment, the database engine is configured to perform a delta compression among data values associated with different timeseries measurements from the plurality of documents within the bucket.

According to one embodiment, the database engine is configured to perform a transformation of a document element to a signed integer. According to one embodiment, the database engine is configured to perform a delta compression operation or a delta-of-delta compression operation of a document element based on a type value of the document element. According to one embodiment, the database engine is configured to perform a zigzag encoding operation using an output of the performed delta compression operation or delta-of-delta compression operation.

According to one embodiment, the database engine is configured to perform a Simple-8b encoding operation using an output of the zigzag encoding operation. According to one embodiment, the database engine is adapted to change a scale encoding of the data values responsive to receiving new timeseries event data.

According to one embodiment, the plurality of documents includes one or more BSON documents. According to one embodiment, the database engine is configured to index the plurality of timeseries events represented by the plurality of respective documents based on time values. According to one embodiment, the database is a non-relational database comprising the plurality of documents. According to one embodiment, the database engine is configured to store a time-based event that is represented by a single logical document.

According to one aspect a system is provided. The system comprises a database engine configured to store, in a database, a plurality of timeseries events as a plurality of documents within a bucket, the database engine being further configured to: store, in a columnar format, the plurality of timeseries events represented by the plurality of respective documents, and determine an index associated with the plurality of respective documents within the bucket. According to one embodiment, the database engine being further configured to determine a geographically-based index relating to the stored plurality of timeseries events represented by the plurality of documents.

According to one embodiment, the geographically-based index comprises an index determined based on metadata associated with the bucket. According to one embodiment, the geographically-based index comprises an index determined based on timeseries event data. According to one embodiment, the database engine is further configured to sort timeseries events by a distance from a query point. According to one embodiment, the database engine is further configured to filter documents based on a distance from a query point. According to one embodiment, the database engine is further configured to add field data specifying a distance from a query point. According to one embodiment, the database engine is further configured to selectively indexing documents that fall within a specified boundary. According to one embodiment, the database engine is further configured to process a query using the determined index.

According to one aspect a system is provided. The system comprises a database engine configured to store, in a database, a plurality of timeseries events as a plurality of documents within a bucket, the database engine being further configured to: store, in a columnar format, the plurality of timeseries events represented by the plurality of respective documents and index the plurality of timeseries events represented by the plurality of respective documents based on time values. According to one embodiment, the database is a non-relational database comprising the plurality of documents.

According to one embodiment, the database engine is configured to index the plurality of documents using a B-tree. According to one embodiment, the database engine is configured to store a time-based event that is represented by a single logical document. According to one embodiment, the database engine is configured to index the plurality of documents based on a user-defined entity. According to one embodiment, the database engine is configured to index the plurality of documents based on metadata values within the plurality of documents. According to one embodiment, the metadata values include at least one of the group comprising a data source and a data region.

According to one embodiment, the database engine is further configured to create an on-demand materialized view of the plurality of documents. According to one embodiment, the on-demand materialized view of the plurality of documents is an independent collection of data. According to one embodiment, the independent collection of data is created within a pipeline processing stage using at least one pipeline operator. According to one embodiment, each bucket of documents represents data collected at a particular moment of time. According to one embodiment, the database engine is adapted to sample the database comprising the plurality of documents within buckets. According to one embodiment, the bucket includes a group of measurements each having the same metadata over a limited period of time. According to one embodiment, each bucket is indexed with a respective key. According to one embodiment, the database engine is configured to perform a random sampling of buckets.

According to one embodiment, the database engine is configured to perform an unpacking of the bucket using a pipeline operator. According to one embodiment, the database engine is configured to perform windowing operations using window bounds based on time and/or the plurality of documents. According to one embodiment, the database engine is adapted to perform a windowing operation that produces an output stage that depends upon a range of input documents defined by the window bounds and a partition key. According to one embodiment, the bucket defines a window of a predetermined amount of time. According to one embodiment, at least one or more buckets associated with a plurality of windows are overlapping with respect to time. According to one embodiment, the database engine is configured to index the plurality of timeseries events based on geographically-based indices. According to one embodiment, the database engine is configured to archive data associated with a selected one or more buckets to a cold storage entity and delete, from a hot storage location, the selected one or more buckets. According to one embodiment, the database engine is configured to archive data to a cold storage entity based on one or more parameters based on the documents.

One or more aspects as described herein may be practiced alone or in combination with any embodiments described in U.S. Patent Application Ser. No. 63/220,332, filed Jul. 9, 2021 entitled "SYSTEMS AND METHOD FOR PRO-CESSING TIMESERIES DATA", incorporated by reference herein which forms an integral part of this application. Further, one or more aspects as described herein may be practiced alone or in combination with any embodiments described in U.S. patent application Ser. No. 17/858,950, filed Jul. 6, 2022 entitled "SYSTEMS AND METHOD FOR PROCESSING TIMESERIES DATA", incorporated by reference herein which forms an integral part of this application.

A number of additional functionalities may be defined that processes elements of the storage format, such as, for example methods for manipulating timeseries data in association with an aggregation pipeline of operations, such as an aggregation pipeline provided in NoSQL systems commercially available from MongoDB. Aggregation pipelines and their operations are more fully described in U.S. Pat. No. 10,366,100, entitled "AGGREGATION FRAMEWORK SYSTEM ARCHITECTURE AND METHOD," filed May 25, 2017 incorporated by reference by its entirety. Using pipelines, the database may create an on-demand material-ized view of the data which comprises an independent collection upon which operations can be performed. Further, methods may be provided for sampling data elements over buckets, performing bucket unpacking operations, perform-ing densification operations on data sets, archiving data buckets to cold storage, performing fast deletes of bucket data, performing windowing operations, among other func-tionalities that can be used with timeseries data.

Still other aspects, examples, and advantages of these exemplary aspects and examples, are discussed in detail below. Moreover, it is to be understood that both the foregoing information and the following detailed description are merely illustrative examples of various aspects and examples and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example." "this and other examples" or the like are not necessarily mutually exclusive and are intended to indicate that a particular feature, structure, or characteristic described in connection with the example may be included in at least one example. The appearances of such terms herein are not necessarily all referring to the same example.

According to one aspect, a system comprises a database engine configured to store, in a database, a plurality of timeseries events as a plurality of documents within a bucket, wherein the plurality of documents includes a plu-rality of fields, the database engine being further configured to store the plurality of timeseries events represented by the plurality of respective documents as a binary stream, wherein the binary stream stores measurements associated with of the plurality of fields. According to one embodiment, the binary stream interleaves measurements associated with the plurality of fields. According to one embodiment, the binary stream includes a reference object configured to store a hierarchy of the plurality of fields. According to one embodiment, the hierarchy of the plurality of fields is stored as a BSON object. According to one embodiment, the binary stream comprises a control byte configured to differentiate between uncompressed and compressed elements. Accord-ing to one embodiment, wherein the control byte is config-ured to indicates the BSON format of the following bytes. According to one embodiment, the control byte is config-ured to indicate Simple-8b encoding. According to one embodiment, the control byte is further configured to indi-cate a scale encoding of data values following the control byte. According to one embodiment, the binary stream is configured to store the same number of measurements for each field of the plurality of fields. According to one embodiment, the binary stream is configured to encode a missing value for a document that is missing a measurement within a field of the plurality of fields. According to one aspect, a method comprises storing, by a database engine in a database, a plurality of timeseries events as a plurality of documents within a bucket, wherein the plurality of docu-ments includes a plurality of fields, the database engine being further configured to store the plurality of timeseries events represented by the plurality of respective documents as a binary stream, wherein the binary stream stores mea-surements associated with of the plurality of fields. Accord-ing to one embodiment, the binary stream interleaves mea-surements associated with the plurality of fields. According to one embodiment, the binary stream includes a reference object configured to store a hierarchy of the plurality of fields. According to one embodiment, the binary stream comprises a control byte configured to differentiate between uncompressed and compressed elements. According to one embodiment, the control byte is configured to indicate Simple-8b encoding. According to one aspect, a non-tran-sitory computer-readable medium containing instruction that, when executed, cause at least one computer hardware processor to perform storing, in a database, a plurality of timeseries events as a plurality of documents within a bucket, wherein the plurality of documents includes a plu-rality of fields, the at least one computer hardware processor being further configured to store the plurality of timeseries events represented by the plurality of respective documents as a binary stream, wherein the binary stream stores mea-surements associated with of the plurality of fields. Accord-ing to one embodiment, the binary stream interleaves mea-surements associated with the plurality of fields. According to one embodiment, the binary stream includes a reference object configured to store a hierarchy of the plurality of fields. According to one embodiment, the binary stream comprises a control byte configured to differentiate between uncompressed and compressed elements. According to one embodiment, the control byte is configured to indicate Simple-8b encoding.

According to one aspect, a system comprises a database engine configured to store, in a database, a plurality of timeseries events in a columnar format, wherein the colum-nar format includes a scale associated with data values associated with the plurality of timeseries events, the data-base engine being further configured to receive a timeseries event includes one or more timeseries measurements, deter-mine a second scale associated with the one or more timeseries measurements, and rescale the data values asso-ciated with the plurality of timeseries events based on the second scale associated with the one or more timeseries measurements, storing the rescaled data values and the one or more timeseries measurements in the columnar format. According to one embodiment, the database engine is fur-ther configured to compare the scale to the second scale, wherein the database engine is configured to perform the rescaling of the scale when the second scale is larger than the scale. According to one embodiment, the rescaling comprises decoding a portion of the data values stored in the columnar format, rescaling the second scale to the portion of the data values, and encoding the rescaled portion of the data values. According to one embodiment, the decoding comprises ZigZag decoding operation and at least one of delta decoding operation or delta-of-delta decoding operation, and the encoding comprises at least one of delta encoding operation or delta-of-delta encoding operation and ZigZag encoding operation. According to one embodiment, the storing of the rescaled data values and the one or more timeseries measurements comprises storing the rescaled plurality of timeseries events and the received timeseries event using at least one Simple-8b block. According to one embodiment, the storing of the rescaled data values and the one or more timeseries measurements comprises determining a Simple-8b selector, writing as many of the rescaled plurality of timeseries events and the received timeseries event to a Simple-8b block using the Simple-8b selector. According to one embodiment, the storing of the rescaled data values and the one or more timeseries measurements further comprises determining a second Simple-8b selector when the rescaled plurality of timeseries events and the received timeseries event overflow the Simple-8b block, writing as many of a remainder of the rescaled plurality of timeseries events and the received timeseries event to a second Simple-8b block using the second Simple-8b selector. According to one embodiment, the one or more timeseries measurements includes one or more floating points. According to one embodiment, the scale is stored in the columnar format within a control byte. According to one aspect, a method comprises storing, by a database engine in a database, a plurality of timeseries events in a columnar format, wherein the columnar format includes a scale associated with data values associated with the plurality of timeseries events, the database engine being further configured to receive a timeseries event includes one or more timeseries measurements, determine a second scale associated with the one or more timeseries measurements, and rescale the data values associated with the plurality of timeseries events based on the second scale associated with the one or more timeseries measurements, storing the rescaled data values and the one or more timeseries measurements in the columnar format. According to one embodiment, the database engine is further configured to compare the scale to the second scale, wherein the database engine is configured to perform the rescaling of the scale when the second scale is larger than the scale. According to one embodiment, the rescaling comprises decoding a portion of the data values stored in the columnar format, rescaling the second scale to the portion of the data values, and encoding the rescaled portion of the data values. According to one embodiment, the decoding comprises ZigZag decoding operation and at least one of delta decoding operation or delta-of-delta decoding operation, and the encoding comprises at least one of delta encoding operation or delta-of-delta encoding operation and ZigZag encoding operation. According to one embodiment, the storing of the rescaled data values and the one or more timeseries measurements comprises, determining a Simple-8b selector, writing as many of the rescaled plurality of timeseries events and the received timeseries event to a Simple-8b block using the Simple-8b selector. According to one aspect a non-transitory computer-readable medium containing instruction that, when executed, cause at least one computer hardware processor to perform storing, by a database engine in a database, a plurality of timeseries events in a columnar format, wherein the columnar format includes a scale associated with data values associated with the plurality of timeseries events, the database engine being further configured to receive a timeseries event includes one or more timeseries measurements, determine a second scale associated with the one or more timeseries measurements, and rescale the data values associated with the plurality of timeseries events based on the second scale associated with the one or more timeseries measurements, storing the rescaled data values and the one or more timeseries measurements in the columnar format. According to one embodiment, the database engine is further configured to compare the scale to the second scale, wherein the database engine is configured to perform the rescaling of the scale when the second scale is larger than the scale. According to one embodiment, the rescaling comprises decoding a portion of the data values stored in the columnar format, rescaling the second scale to the portion of the data values, and encoding the rescaled portion of the data values. According to one embodiment, the decoding comprises ZigZag decoding operation and at least one of delta decoding operation or delta-of-delta decoding operation, and the encoding comprises at least one of delta encoding operation or delta-of-delta encoding operation and ZigZag encoding operation. According to one embodiment, the storing of the rescaled data values and the one or more timeseries measurements comprises determining a Simple-8b selector, writing as many of the rescaled plurality of timeseries events and the received timeseries event to a Simple-8b block using the Simple-8b selector. According to one embodiment, the storing of the rescaled data values and the one or more timeseries measurements further comprises determining a second Simple-8b selector when the rescaled plurality of timeseries events and the received timeseries event overflow the Simple-8b block, writing as many of a remainder of the rescaled plurality of timeseries events and the received timeseries event to a second Simple-8b block using the second Simple-8b selector.

According to one aspect, a system comprises a database engine configured to store, in a database, a plurality of timeseries events in a binary stream, wherein the plurality of timeseries events includes a plurality of fields, wherein the binary stream stores measurements associated with the plurality of fields and includes a reference object configured to store a hierarchy of the plurality of fields, the database engine being further configured to receive a timeseries event including one or more timeseries measurements, append the binary stream to incorporate the received timeseries event, and store the appended binary stream in the database. According to one embodiment, the binary stream comprises a Simple-8b block encoding delta compressed or delta-of-delta compressed data values associated with different timeseries measurements from the plurality of documents. According to one embodiment, appending the binary stream further comprises performing a delta compression operation or a delta-of-delta compression operation on the one or more timeseries measurements of the received timeseries event, determining an optimal Simple-8b selector for the Simple-8b block based on the compressed one or more timeseries measurements, rewriting the Simple-8b block with the optimal Simple-8b selector when the one or more timeseries measurements fits in the Simple-8b block writing a second Simple-8b block when the one or more timeseries measurements overflows the Simple-8b block. According to one embodiment, the optimal Simple-8b selector is determined using a greedy algorithm. According to one embodiment, appending the binary stream further comprises replacing the reference object with a second reference object when the received timeseries event includes a new field, wherein the second reference object is configured to store a hierarchy of the plurality of fields and the new field. According to one embodiment, appending the binary stream further comprises creating a new sub-stream including measurements associated with the new field. According to one embodiment, appending the binary stream further comprises determining whether the received timeseries event is compatible with the reference object, and ending a sub-object compression and restarting a second sub-object compression when the received timeseries event and the reference object are incompatible, wherein the second sub-object compression includes a second reference object. According to one embodiment, the binary stream further comprises a scale encoding of data values associated with the plurality of timeseries events, appending the binary stream further comprises calculating a scale associated with the one or more timeseries measurements of the received timeseries data, and comparing the scale of the one or more timeseries measurements with the scale encoding of the data values, rescale the data values based on the scale of the received timeseries data, and write the data values and the one or more timeseries measurements using Simple-8b encoding operation. According to one embodiment, the received time-series event includes one or more floating points. According to one aspect, a method comprises storing, by a database engine in a database, a plurality of timeseries events in a binary stream, wherein the plurality of timeseries events includes a plurality of fields, wherein the binary stream stores measurements associated with the plurality of fields and includes a reference object configured to store a hier-archy of the plurality of fields, the database engine being further configured to receive a timeseries event including one or more timeseries measurements, append the binary stream to incorporate the received timeseries event, and store the appended binary stream in the database. According to one embodiment, the binary stream comprises a Simple-8b block encoding delta compressed or delta-of-delta com-pressed data values associated with different timeseries measurements from the plurality of documents. According to one embodiment, appending the binary stream further comprises performing a delta compression operation or a delta-of-delta compression operation on the one or more timeseries measurements of the received timeseries event, determining an optimal Simple-8b selector for the Simple-8b block based on the compressed one or more timeseries measurements, rewriting the Simple-8b block with the opti-mal Simple-8b selector when the one or more timeseries measurements fits in the Simple-8b block writing a second Simple-8b block when the one or more timeseries measure-ments overflows the Simple-8b block. According to one embodiment, the optimal Simple-8b selector is determined using a greedy algorithm. According to one embodiment, appending the binary stream further comprises replacing the reference object with a second reference object when the received timeseries event includes a new field, wherein the second reference object is configured to store a hierarchy of the plurality of fields and the new field. According to one aspect, a non-transitory computer-readable medium contain-ing instruction that, when executed, cause at least one computer hardware processor to perform storing, by a data-base engine in a database, a plurality of timeseries events in a binary stream, wherein the plurality of timeseries events includes a plurality of fields, wherein the binary stream stores measurements associated with the plurality of fields and includes a reference object configured to store a hier-archy of the plurality of fields, the database engine being further configured to receive a timeseries event including one or more timeseries measurements, append the binary stream to incorporate the received timeseries event, and store the appended binary stream in the database. According to one embodiment, the binary stream comprises a Simple-8b block encoding delta compressed or delta-of-delta com-pressed data values associated with different timeseries measurements from the plurality of documents. According to one embodiment, appending the binary stream further comprises performing a delta compression operation or a delta-of-delta compression operation on the one or more timeseries measurements of the received timeseries event, determining an optimal Simple-8b selector for the Simple-8b block based on the compressed one or more timeseries measurements, rewriting the Simple-8b block with the opti-mal Simple-8b selector when the one or more timeseries measurements fits in the Simple-8b block writing a second Simple-8b block when the one or more timeseries measure-ments overflows the Simple-8b block. According to one embodiment, the optimal Simple-8b selector is determined using a greedy algorithm. According to one embodiment, appending the binary stream further comprises replacing the reference object with a second reference object when the received timeseries event includes a new field, wherein the second reference object is configured to store a hierarchy of the plurality of fields and the new field. According to one embodiment, appending the binary stream further comprises determining whether the received timeseries event is com-patible with the reference object, and ending a sub-object compression and restarting a second sub-object compression when the received timeseries event and the reference object are incompatible, wherein the second sub-object compres-sion includes a second reference object.

BRIEF DESCRIPTION OF DRAWINGS

Various aspects of at least one embodiment are discussed herein with reference to the accompanying figures, which are not intended to be drawn to scale. The figures are included to provide illustration and a further understanding of the various aspects and embodiments and are incorpo-rated in and constitute a part of this specification but are not intended as a definition of the limits of the invention. Where technical features in the figures, detailed description or any claim are followed by references signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

FIG. 2 shows an example schema that may be used to store timeseries data;

FIG. 11B shows one example process that may be used to compress and encode multiple timeseries measurements according to various embodiments;

DETAILED DESCRIPTION

As discussed, various aspects relate to storing timeseries data in non-relational database formats such as NoSQL and performing functions such as compression and indexing on that timeseries data. In some embodiments, timeseries event information is stored as a discrete document within a database. The database may be arranged in buckets which represent periods of time in which the events occur, and therefore the documents are collected within the buckets. The documents may include timestamp information as well as one or more metadata values (e.g., a key-value pair) which can be defined that describe the timeseries. For instance, in the case of an IoT device, one or more measurements may be stored as metadata within a particular document that represents the event. Measurement data associated with measured values during events (and are stored in documents) may include key-value pairs observed at a specific time (e.g., by an IoT device). A compilation of measurement data may be stored as a timeseries defined as a sequence of measurements over time.

Further, a bucket may be defined which includes a number of measurements having the same metadata types measured over a limited period of time. A bucket collection may be defined that is used for storing multiple buckets in a timeseries collection. In some embodiments, database operations such as replication, sharding, and indexing may be performed at the level of buckets in the bucket collection.

Buckets may be stored in a columnar format and may be indexed by a B-tree for easy retrieval. Further, the data structure may be indexed based on time and/or one or more metadata values within the documents. Further, as discussed, one or more pipeline operators may be used to perform operations associated with the timeseries data. In some embodiments, an on-demand materialized view that comprises an independent collection of data may be operated on by the system using one or more pipeline operators and/or stages.

Figure 1:
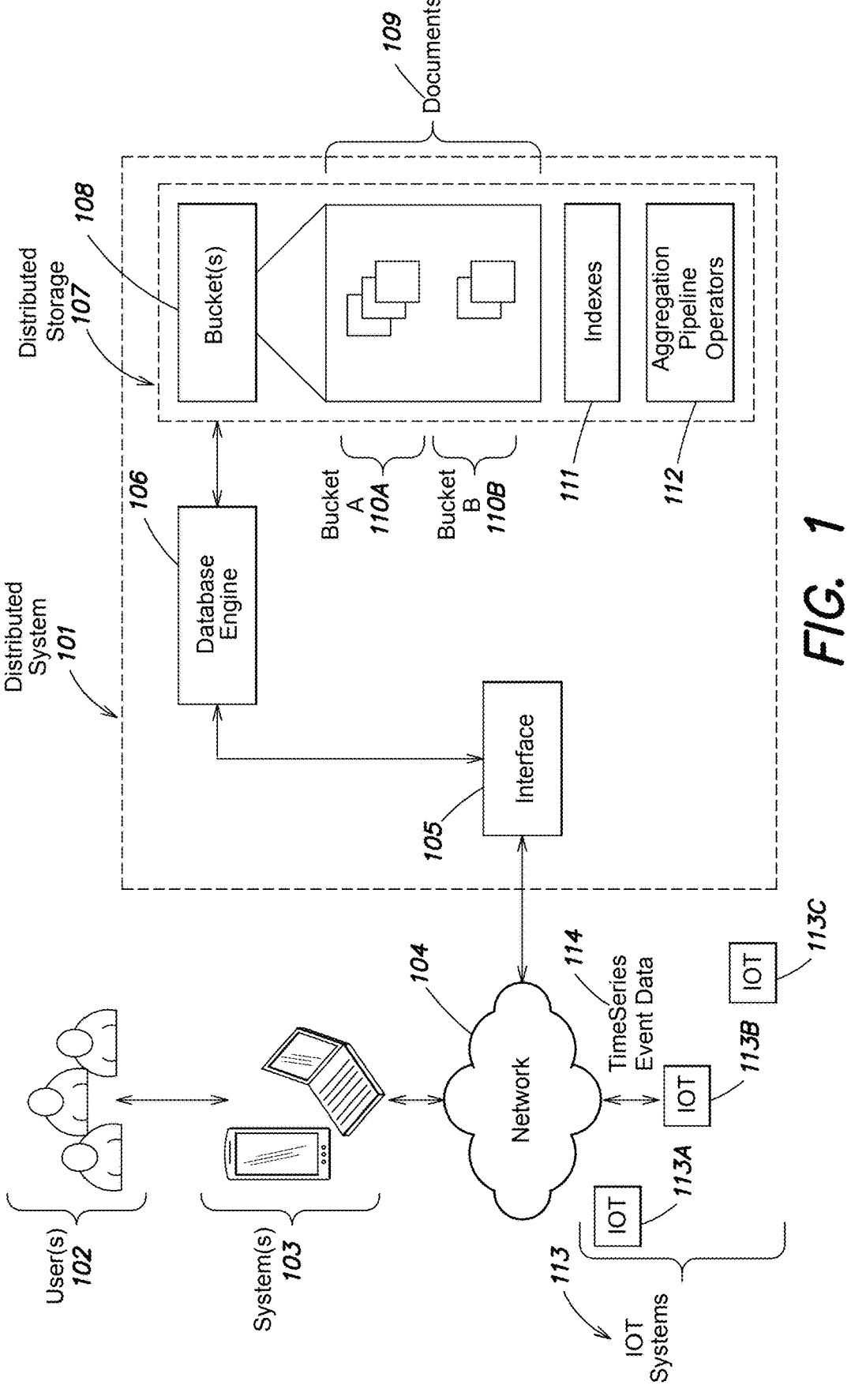
FIG. 1 shows a block diagram of an example distributed database system that may be used to store timeseries data, according to some embodiments.

FIG. 1 shows a block diagram of an example distributed database system 101 that may be used to store timeseries data, according to some embodiments. In particular, a distributed system 101 is provided that includes a number of components coupled to one or more networks (e.g., network 104). Distributed system 101 fulfills one or more database operations requested by one or more systems 103 which may be, in some embodiments, in turn operated by one or more users 102 or other entities. For instance, in some examples, applications running on end user devices may be programmed to use a database for underlying data management functions. It should be appreciated that other systems, applications, client systems, or other entities may use database services.

In some embodiments as described herein, one or more data sources may generate timeseries event data 114 which is then processed and stored by database engine (e.g., database engine 106). For example, timeseries data may be generated by one or more systems such as those that may typically create event data such as in the manufacturing, financial services, or other types of systems. In some embodiments, one or more IoT systems (e.g., systems 113 (elements 113A-113C)) may generate events which are stored within the distributed system 101. For example, it is appreciated that there may be a number of systems that can generate and store timeseries data that may be stored by distributed system 101, and various embodiments are not limited to any particular number or type of data generating systems.

Timeseries event data is passed to the distributed system 101, received by an interface (e.g., interface 105) and forwarded to a database engine 106 which is configured to perform one or more database operations. Database engine 106 may include a number of elements including processors, elements such as routers, or other elements. Database engine 106 may include any entity related to storing data, may include hardware and/or software. In some embodiments, the database engine may include one or more processes and one or more storage entities that manage and store database entities such as documents. In some embodiments, the database engine may include a modified mongod process (commercially available from MongoDB) that is executed by a processor. Data is stored in a distributed storage entity 107 which includes one or more systems and/or storage elements.

In some embodiments, a logical structure is defined referred to herein as a bucket (e.g. bucket 108) which defines a period of time in which event data may be stored. Storage 107 may store one or more buckets (e.g., bucket A (element 110A), bucket B (element 110B)). These buckets may contain one or more documents 109 that correspond to event data collected from one or more systems. Further, system 101 may include one or more indexes used to index time-series data, one or more pipeline operators used to perform operations on timeseries data, and other elements used to facilitate timeseries operations (e.g., windowing commands).

FIG. 2 shows as an example schema format that may be used to store timeseries data in a bucketized format. For example, the _id is chosen by the database server and is an ObjectId. The control field is an object that includes the version number as well as min and max fields that hold the minimum and maximum value of each field as determined by a BSON comparison order, taking into account any specified collation. The minimum/maximum of two BSON documents or of two arrays is the field-by-field minimum or maximum. The meta field may be of any BSON type and contains either the value of the metaField field as specified at collection creation time, or null if that field is absent. This means that measurements with explicit null metadata and absent metadata will be placed into the same bucket. Measurements with an equal meta field (ignoring field order, and not considering collation) are included in the same bucket. The data field is an object that contains a nested object for each field (e.g., 'id', 'time', 'field0', etc.) present in any of the inserted measurements. These nested objects have field names that are decimal string representations of an incrementing counter starting at "0", reflecting the number of measurements inserted so far.

As discussed, by defining timeseries data as a collection of buckets and associated documents, other operations and functions may be performed on this timeseries data. For example, methods may be provided for sampling data elements over buckets, performing bucket unpacking operations, performing densification operations on data sets, archiving data buckets to cold storage, performing fast deletes of bucket data, performing windowing operations, among other functionalities that can be used with timeseries data.

Figure 3:
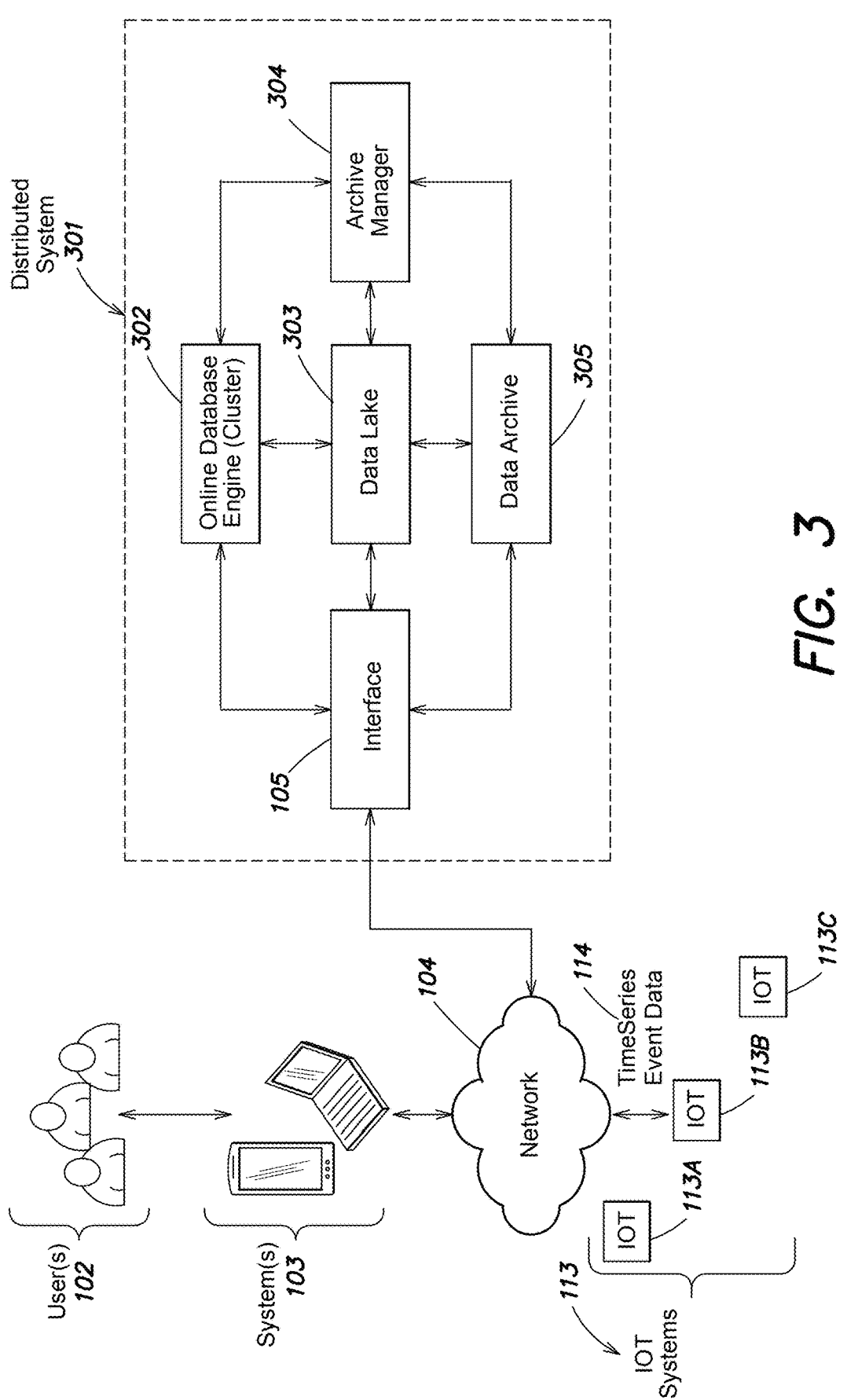
FIG. 3 shows an example distributed system that may be used to store and archive timeseries data.

FIG. 3 shows an example distributed system that may be used to store and archive timeseries data in accordance with various embodiments. In some embodiments, it is appreciated that timeseries data may be stored in one or more systems and databases, and in some embodiments, time-series data may be more intelligently archived to long term (or cold) storage. Some implementations are described in U.S. patent application Ser. No. 17/341,896 filed Jun. 8, 2021, and incorporated by reference by its entirety.

FIG. 3 shows a block diagram of an example distributed database system 301 according to some embodiments. In particular, a distributed system 301 is provided that includes a number of components coupled to one or more networks (e.g., network 104). Distributed system 301 fulfills one or more database operations requested by one or more systems 103 which may be, in some embodiments, in turn operated by one or more users 102 or other entities. For instance, in some examples, applications running on end user devices may be programmed to use a database (e.g., a DaaS) for underlying data management functions. It should be appreciated that other systems, applications, client systems, or other entities may use database services. As discussed, the system may be configured to store and process timeseries data generated by one or more systems (e.g., timeseries event data generated by IoT systems 113).

In some embodiments, distributed system 301 includes a hot-storage-type database as well as a cold-storage-type database for fulfilling database requests. In one embodiment, the distributed system provides a single access interface 105 performing database operations on both types of databases. In some examples, the online database is a DaaS-type database and may include, for example, cluster-based system. Online database engine 302 may be provided that performs read and write operations to storage entities configured in a database cluster (e.g., a cluster-based database such as the ATLAS database commercially available from MongoDB).

In some embodiments, an archive manager (e.g., archive manager 304) is provided that controls how data is archived from the online database to a data archive (e.g., data archive 305). In some implementations, the data archive may be implemented as cloud-based storage elements. For example, the data archive may use data buckets defined on S3 to create one or more archives associated with an online database. In some embodiments, a capability is provided for archiving data by the database management system that reduces management effort on behalf of application creators. In some embodiments, an archive manager 304 is provided that automatically archives data from an online database to an off-line database while maintaining a single point of interface to the database. In this manner, archiving operations are transparent to end user applications.

Further, a database may be provided that fulfills data read operations from one or more hot and cold data sources. In some embodiments, a data lake (e.g., data lake 303) is provided that provides a single view of offline and online storage. As is known, data lakes generally have the ability to store both structured and unstructured data. In some embodiments, the data lake may service read operations that reference an online database. In some embodiments, the database is a DaaS-based database that implements online storage using a cluster of nodes (e.g., online database (cluster) 302). Further, the data lake services read operations to a data archive (e.g., data archive 305, such as for example, one or more S3 data buckets). In some embodiments, the data lake may be used as a single view of online cluster data and archive data. FIGS. 4-7 discussed below relate to various operations relating to bucket sampling, bucket unpacking, windowing operations and secondary indexing. Some additional embodiments are discussed in more detail in the U.S. Patent Application Ser. No. 63/220,332, filed Jul. 9, 2021 entitled "SYSTEMS AND METHOD FOR PROCESSING TIMESERIES DATA".

Bucket Sampling

Figure 4:
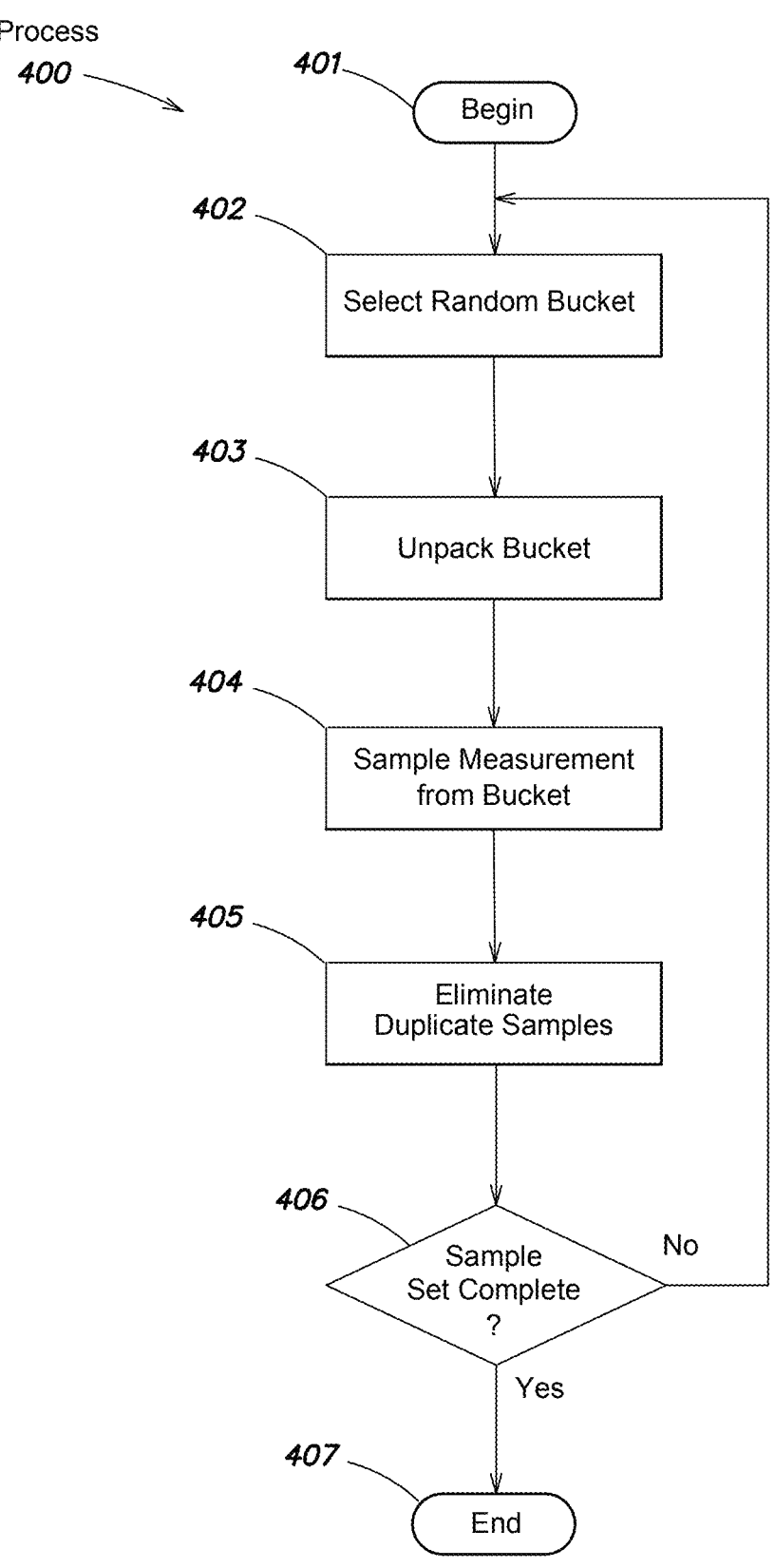
FIG. 4 shows an example process used to sample bucket data according to various embodiments.

Also, it may be desired to sample timeseries data for the purpose of determining certain attributes regarding the measurement data. Samples are critical for understanding flexible schemas of document collections. They can also be used for other purposes, including cardinality estimation. FIG. 4 shows an example process used to sample bucket data according to various embodiments. At block 401, process 400 begins. At block 402 the system selects a random bucket from the collection to be sampled. For instance, this may be accomplished using one or more randomization functions provided by the system.

At block 403, the system unpacks the bucket, and at block 404 sample measurement is taken from at least one document within the bucket. It should be appreciated that this process can involve accidentally sampling duplicate entries, therefore a system and process may be provided for eliminating duplicate samples such as at block 405. For instance, sampled items can be tracked and if selected again, the system may proceed without performing a duplicate sample. At block 406, it is determined whether the sample set is complete. If yes, process 400 ends at block 407. If not, the system proceeds to select another random bucket at block 402.

Bucket Unpacking

Figure 5:
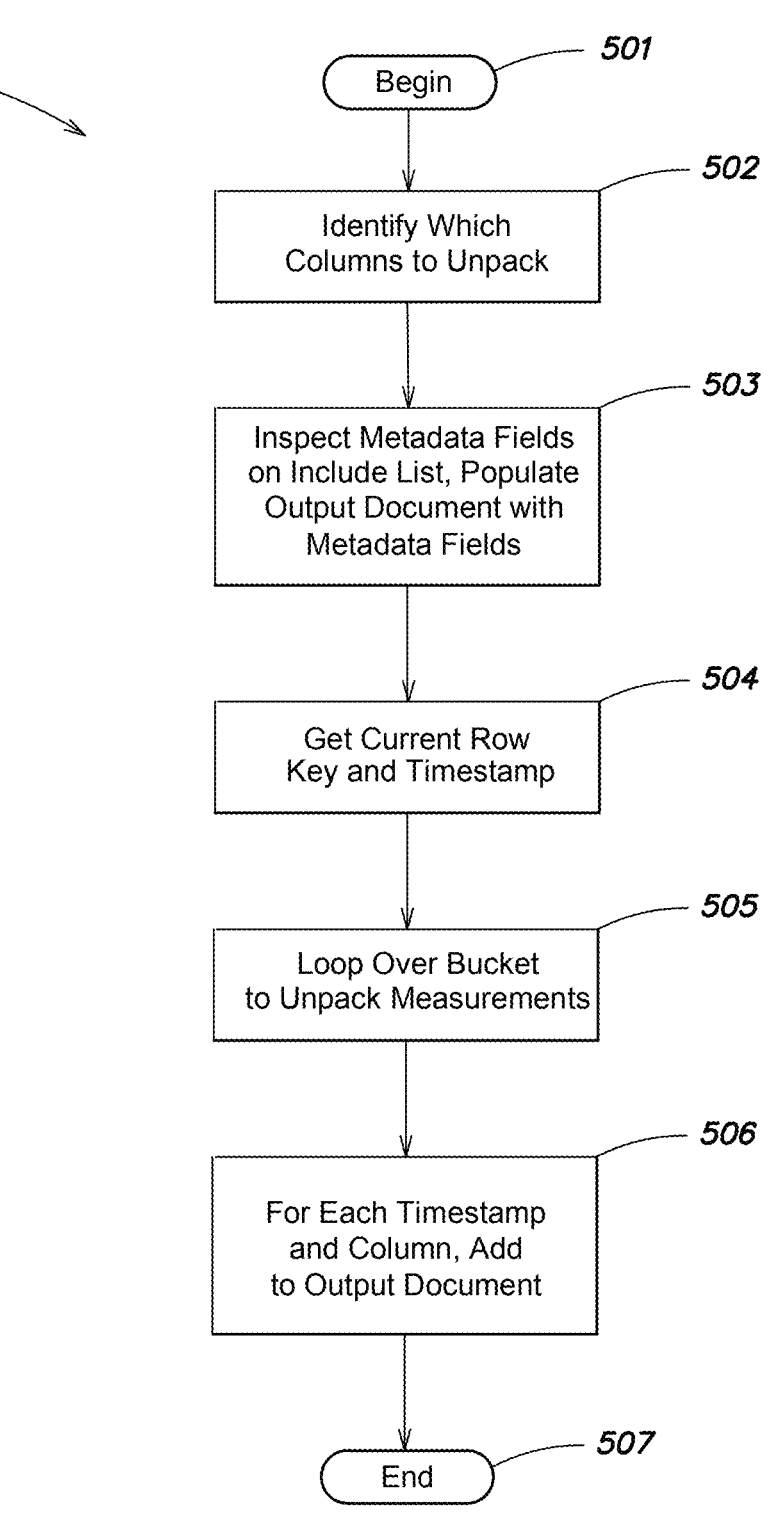
FIG. 5 shows an example unpack operation that may be used for processing bucketed timeseries data according to various embodiments.

FIG. 5 shows an example unpack operation that may be used for processing bucketed timeseries data. At block 501, process 500 begins. At block 502, the system identifies which columns to unpack. For instance, an unpack operation may be used in association with other operations such as a random sampling, or location of particular buckets to unpack. At block 503, the system inspects metadata fields on the include list and populates an output document with metadata fields. At block 504, the system gets a current row key and timestamp. At block 505, the system loops over the bucket to unpack the measurements defined within the documents. For each timestamp and column, the system adds the measurement to the output document at block 506. At block 507, process 500 ends.

Windowing Operations

Figure 6:
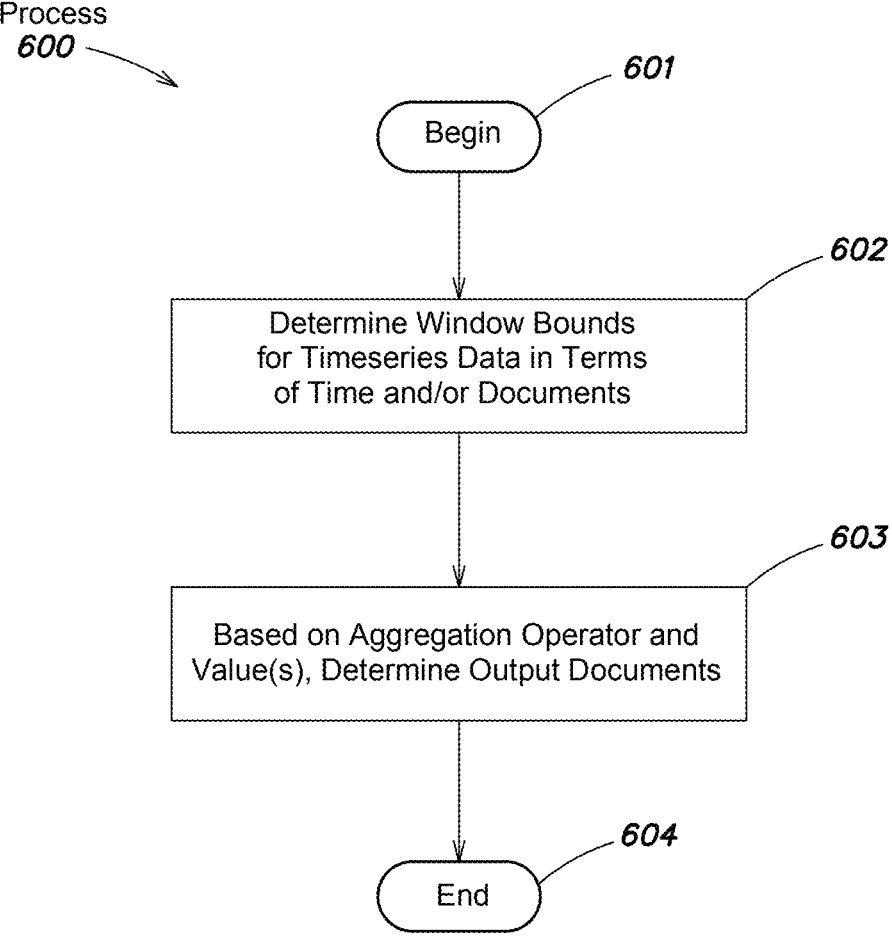
FIG. 6 shows an example windowing operation according to various embodiments.

As discussed, it may be desired, depending on the operation to be performed, to permit analysis of timeseries according to one or more window-based operations. FIG. 6 shows an example windowing operation according to various embodiments. At block 601, process 600 begins. At block 602 the system determines window bounds for timeseries data in terms of time and/or documents. As discussed, a more useful implementation of windowing operations that can be set in terms of time or documents is provided. Most databases can either set this in the form "3 rows preceding 5 rows following" or "5 minutes prior". In some implementations as defined herein, the system is configured to both and the latter with the same flexibility as the former e.g. "5 minutes prior, 3 minutes following". At block 603, based on an aggregation operator and value(s) specified, the system determines one or more output documents. At block 604, process 600 ends.

Secondary Indexing

Figure 7:
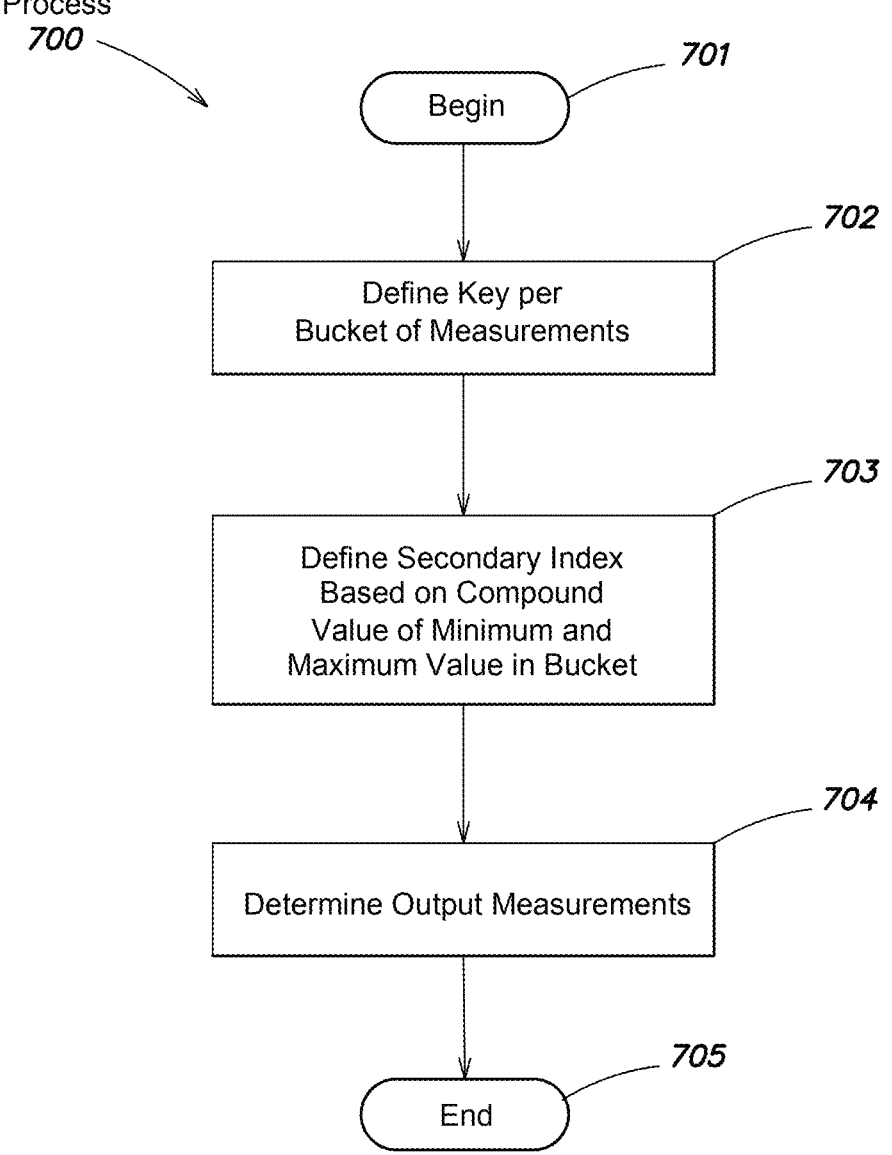
FIG. 7 shows an example process for creating a secondary index according to various embodiments.

FIG. 7 shows an example process for creating a secondary index according to various embodiments. At block 701, process 700 begins. At block 702 the system defines a key per bucket of measurements. At block 703, the system defines a secondary index based on a compound value of a minimum and maximum values within the bucket. At block 704, the system determines the output measurements based on the secondary index. At block 705, process 700 ends.

As discussed above, various aspects relate generally to compression of timeseries data within a document database. Also, according to some aspects, methods are provided herein for determining secondary indexes as further outlines below.

Columnar Compression of Timeseries Data Example Implementations

Figure 8:
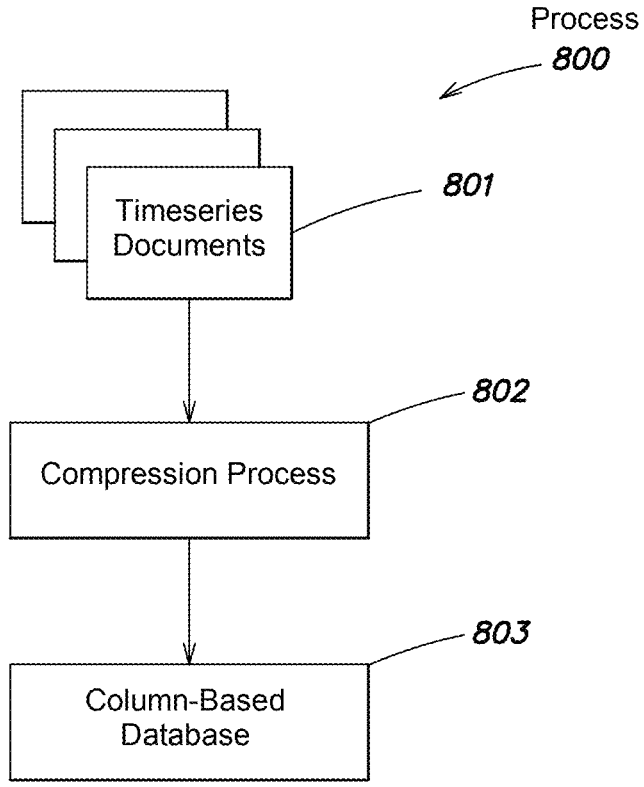
FIG. 8 is a block diagram of a process for compressing timeseries documents according to various embodiments.

According to some embodiments, a database engine and process are provided for compressing timeseries data stored within a document database (e.g., such as a MongoDB-type database). FIG. 8 shows an example process 800 for compressing timeseries information according to various embodiments. The system (e.g., a distributed database system such as those provided by MongoDB) are configured to store timeseries event data stored as documents 801 and perform a compression process 802 on those documents. The resulting representations are stored in a column-based database 803.

According to some embodiments, columnar compression may be used that utilizes on Simple-8b compression in its core but adds a number of features that work together to significantly improve practical compression in situations where data does not consist of just neat columns of integers. In some embodiments, one or more of the following design assumptions may be used:

The best case may be made worse in order to make the worst case better: e.g., enabling compression should (in theory) never increase data size.

Optional fields are common, so missing values may be similarly efficient as repeated values.

Floating-point data generally represents decimal data with a limited number of decimal places. Small changes in those digits may be encoded efficiently.

Positional access is important, so accessing a value by position in the column may have an efficiency that is O (compressed size) rather than O (expanded size).

While Simple-8b is an efficient way of dividing a 64-bit word in a 4-bit selector and a varying number of slots with the same width in bits due to the many factors of the value 60, it is appreciated that Simple-8b does not take advantage of any of the above assumptions to increase efficiency. The inventors have appreciated that enhancements in encoding both the first byte including the 4-bit selector as well as the bit-packed fields that follow the selector to improve on that base level.

Below is a summary of example techniques that may be used to compress timeseries data according to some embodiments.

For instance, one or more of the following techniques may be used to perform compression:

Storing floating points efficiently in Simple-8b by scaling and rounding to integer.

Storing negative numbers efficiently in Simple-8b by combining with Google's ZigZag encoding.

Efficient encoding for optional/missing fields.

Per-type integer transformation to efficiently store per-type deltas in a single binary format (Simple-8b).

Extension of Simple-8b to efficiently store integers with trailing zeros by using unused bits of some selectors.

Element lookup by index with linear time complexity in compressed size by being able to look at first byte in Simple-8b to determine the number of elements in the block.

Compression of complex objects with multiple sub-fields with minimal overhead. Allows users to take advantage of a flexible schema (e.g., of a MongoDB database) with compression.

Column Compression

As discussed, values within one or more documents may be compressed using one or more techniques applied alone or in combination. In some embodiments, one or more of the following compression techniques may be used to compress timeseries data.

Delta Compression

When storing time-series data the system may take advantage of the data being time-series in nature containing sensor data, analytics, etc. Instead of storing absolute values, it may be assumed that the measurements will not change rapidly between each other. If for example, the system is storing data from a sensor measuring atmospheric pressure every minute with typical averages of 985 hPa, it can be seen how the deltas between two measurements will be close to zero where the absolute value is a large number.

Delta-of-Delta Compression

With data that has a monotonic increase, the system may further minimize the size of the number the system stores by Simple-8b selector reference table to determine the subdivision ranges of the remaining 60 bits. The selector reference table may include a selector value row, a row indicating the number of slots associated with the selector value, a row indicating the bits per slot associated with the selector value, and a selector extension bits row. For example, if the selector value is one, the reference table may indicate that the 60 bits are divided into 60 slots such that each slot is one bit. If the selector value is two, the reference table may indicate that the 60 bits are divided into 30 slots such that each slot is two bits.

TABLE 1

| An exemplary Simple-8b selector reference table for determining subdivision ranges of the remaining 60 bits. | | | | | | | | | | | | | | | | |
|---|---|---|---|---|---|---|---|---|---|---|---|---|---|---|---|---|
| Selector value | 0 | 1 | 2 | 3 | 4 | 5 | 6 | 7 | 8 | 9 | 10 | 11 | 12 | 13 | 14 | 15 RLE |
| Num slots | — | 60 | 30 | 20 | 15 | 12 | 10 | 8 | 7 | 6 | 5 | 4 | 3 | 2 | 1 | 0 |
| Bits/slot | — | 1 | 2 | 3 | 4 | 5 | 6 | 7 | 8 | 10 | 12 | 15 | 20 | 30 | 60 | 0 |
| Selector extension bits | — | 0 | 0 | 0 | 0 | 0 | 0 | 4 | 4 | 0 | 0 | 0 | 0 | 0 | 0 | 4 | calculating a delta of the delta, which may also be referred to as the delta-of-delta. In the example above, if an uptime in seconds for the atmospheric pressure sensor is stored, the system will typically see an increase of 60 as the system (e.g., an IoT pressure sensor) sampled every minute whereas this stored as delta-of-delta would be reduced to just 0.

In some embodiments, delta compression may be more beneficial than delta-of-delta compression. If the delta between measurements fluctuates between 0 and X, the delta-of-delta may be in the range of –X and X, which may require one more bit to encode.

Storing Multiple Measurements in a Single Integer Value Using Simple-8b

Delta and delta-of-delta compression reduces the number of meaningful bits the system needs to store for a measurement, but the system also need a way to pack this efficiently in a data format.

Figure 16:
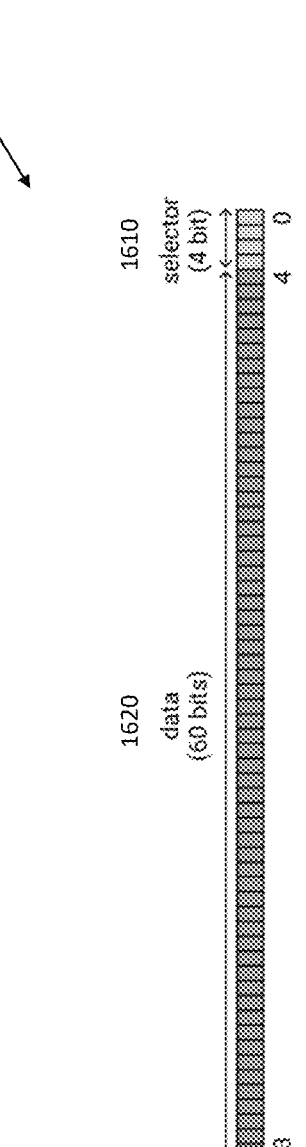
FIG. 16 shows an example of the Simple-8b technique using a Simple-8b block according to various embodiments.

FIG. 16 shows an example of the Simple-8b technique using a Simple-8b block, according to some embodiments. Simple-8b is an encoding to pack multiple small integers into a single 64 bit word, hereafter called Simple-8b block. More integers may be packed into a single block if fewer bits are required to represent the integers. Simple-8b encoding can be suitable for storing delta and delta-of-delta values of measurements that do not change rapidly. The delta and delta-of-delta values of measurements that do not change rapidly may have values close to zero and can be represented with just a few bits.

Figure 17:
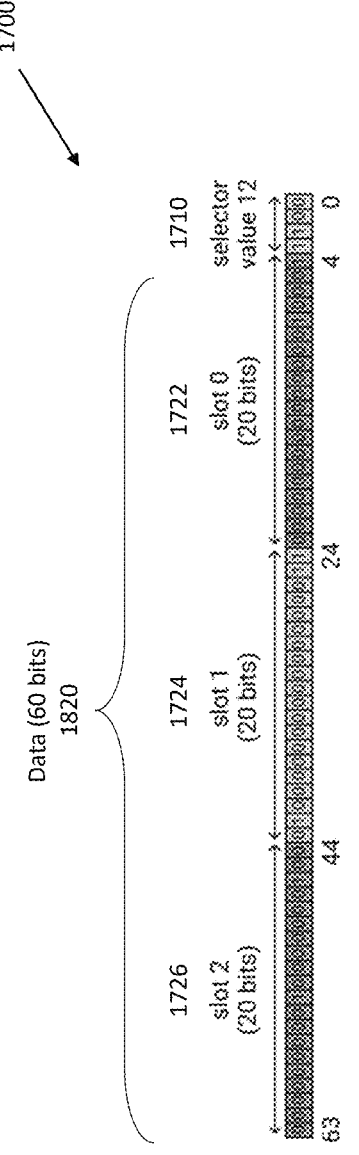
FIG. 17 shows an example of storing values within the Simple-8b block using the Simple-8b technique according to various embodiments.

In some embodiments, the Simple-8b technique may take a 64 bit integer 1600 and may use 4 bits to encode a selector 1610. The selector 1610 may describe how the remaining 60 bits are subdivided into slots. The subdivision ranges from a single slot using all the available 60 bits to having 60 values using just 1 bit each. Table 1 shows an example FIG. 17 shows an example of storing values within the Simple-8b block 1700 using the Simple-8b technique, according to some embodiments. As shown in FIG. 17, the system can for example store 3 values (0x11, 0x4003, 0x404) in a single 64 bit integer 1700 by using the selector value 12 (e.g., element 1710) that subdivides the 60 data bits 1720 into 3 slots of 20 bits each (e.g., elements 1722, 1724, 1726).

0x0000000000040003 may be stored as by removing the leading zeros 0x40003.

Figure 18:
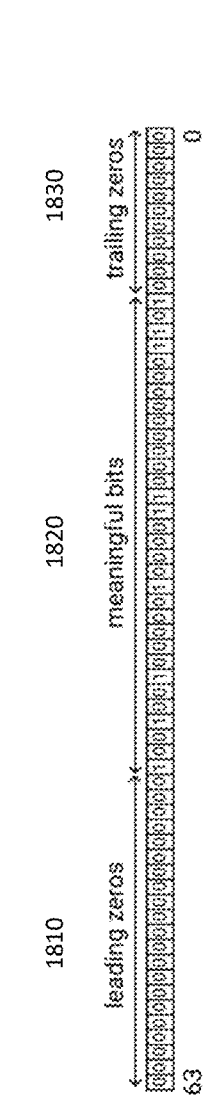
FIG. 18 shows an example of bits in integer values according to various embodiments.

FIG. 18 illustrates the bits in integer values 1800, according to some embodiments. The bits in integer values 1800 are categorized as leading zeros (e.g., element 1810), trailing zeros (e.g., element 1820), and meaningful bits (e.g., element 1830).

When storing in Simple-8b, the system may calculate the smallest possible slot size by removing the leading zeros. This may be performed using the _builtin_clzll intrinsic. As the system stores measurement deltas or delta-of-deltas, the measurement deltas or delta-of-deltas may have a large number of leading zeros that can be omitted.

In some embodiments, when storing in Simple-8b, all slots must be used. The smallest slot size that can store a sequence of measurements may be selected. Small values may be stored together with larger values and may be padded with leading zeros to fill up the Simple-8b slots.

Negative Values

The inventors have appreciated that a more efficient technique for storing delta or delta-of-delta values may be utilized. Normally negative values are represented in binary using Two's complement where the sign is stored in the most significant bit.

The value –1 in Two's complement is 0xFFFF 'FFFF' FFFF' FFFF which is 64 meaningful bits and cannot be stored efficiently in Simple-8b above.

Instead of using Two's complement, in some embodiments, the system may use an encoding that stores the sign of the value in the least significant bit, which may allow for small integers to be obtained when interpreted as unsigned. This does not require a sign extension and works well with different bit widths. Further, this technique concentrates changes in signed numbers in the lower bits of the value, making it suitable for delta-compressed values with leading zeros removed and stored in Simple-8b. In some implementations, the system may also use the ZigZag encoding from Google's Protocol Buffers. The encoding is as followers for a signed integer n:

$$ZigZag := (n << 1) \hat{} (n >> 31)$$

−1 is encoded as 1, 1 is encoded as 2, −2 is encoded as 3, 2 is encoded as 4, and so on.

BSON Types

The BSON format used by the servers which contain multiple data types each with a different binary format. To be able to use the techniques described above, in some embodiments, the data may be transformed into a signed integer such that the system can calculate deltas and store the deltas in Simple-8b. The system may use a per-type transformation that places as much entropy in the least significant bytes as possible so the calculated delta may be as small as possible.

Depending on the BSON type the system also selects if delta or delta-of-delta compression is used. Some data types may have monotonic increases by nature and the system may use delta-of-delta or the other data types use delta to be as flexible as possible depending on the user data. Table 2 shows an example reference table of various BSON types with the corresponding value type and integer transformation, according to some embodiments.

TABLE 2

An example reference table of BSON types with
corresponding value type and integer transformation.

| BSON type | Value type | Integer transformation |
|---|---|---|
| Double (0x01) | Delta | Double scaled and rounded to nearest integer (details below). Fallback to interpret as integer if not possible. |
| String (0x02) | Delta | For strings up to 16 bytes: String is reversed and loaded as 128 bit integer (little endian). Reversed to make change in last character produce small delta. |
| Document (0x03) | N/A | Sub-object encoding (details below) |
| Array (0x04) | N/A | Sub-object encoding (details below) |
| Binary (0x05) | Delta | Size needs to be unchanged and at most 16 |

TABLE 2-continued

An example reference table of BSON types with
corresponding value type and integer transformation.

| BSON type | Value type | Integer transformation |
|---|---|---|
| Undefined (0x06) | Delta | Constant type. 0 or missing only possible values. |
| ObjectId (0x07) | Delta-of-delta | See below |
| Boolean (0x08) | Delta | True: 1 False: 0 |
| Datetime (0x09) | Delta-of-delta | Load as 64 bit integer (little endian) |
| Null (0x0A) | Delta | Constant type. 0 or missing only possible values. |
| Regex (0x0B) | N/A | N/A. Always stored uncompressed. |
| DBPointer (0x0C) | N/A | N/A. Always stored uncompressed. |
| Code (0x0D) | Delta | Same as string. |
| Symbol (0x0E) | N/A | N/A. Always stored uncompressed. |
| Code w Scope (0x0F) | N/A | N/A. Always stored uncompressed. |
| 32 bit Integer (0x10) | Delta | N/A |
| Timestamp (0x11) | Delta-of-delta | Load as 64 bit integer (little endian) |
| 64 bit Integer (0x12) | Delta | N/A |
| Decimal128 (0x13) | Delta | Load as 128 bit integer (little endian) |

ObjectID Integer Transformation

Table 3 shows an example ObjectId that is a 12 byte value. The ObjectId of Table 3 may have the following meaning of the different bytes.

TABLE 3

An example ObjectId with corresponding byte usage and byte index.
ObjectId

| Byte usage | TS0 | TS1 | TS2 | TS3 | PU0 | PU1 | PU2 | PU3 | PU4 | C0 | C1 | C2 |
|---|---|---|---|---|---|---|---|---|---|---|---|---|
| Byte index | 0 | 1 | 2 | 3 | 4 | 5 | 6 | 7 | 8 | 9 | 10 | 11 |

TS = Timestamp in big endian
PU = Process unique identifier
C = Counter in big endian The encoder may rearrange the bytes to have the bytes most likely to change at the lower byte indexes. During encoding of the ObjectId, the process unique identifier should not have changed and may be discarded. Table 4 shows an example encoded ObjectId having the bytes rearranged such that the bytes most likely to change are placed at the lower byte index. Further, Table 4 shows that the example encoded ObjectId with a discarded process unique identifier. When reconstructing the encoded ObjectId, the process unique identifier is taken from the previous uncompressed element.

TABLE 4

An example encoded ObjectID.
ObjectId

| Byte usage | C2 | TS3 | C1 | TS2 | C0 | TS1 | TS0 |
|---|---|---|---|---|---|---|---|
| Byte index | 0 | 1 | 2 | 3 | 4 | 5 | 6 |

The remaining 7 bytes, following the encoding, may loaded as a 64 bit integer (little endian).

Example Algorithm for Storing BSON Element in Simple-8b

Figure 9:
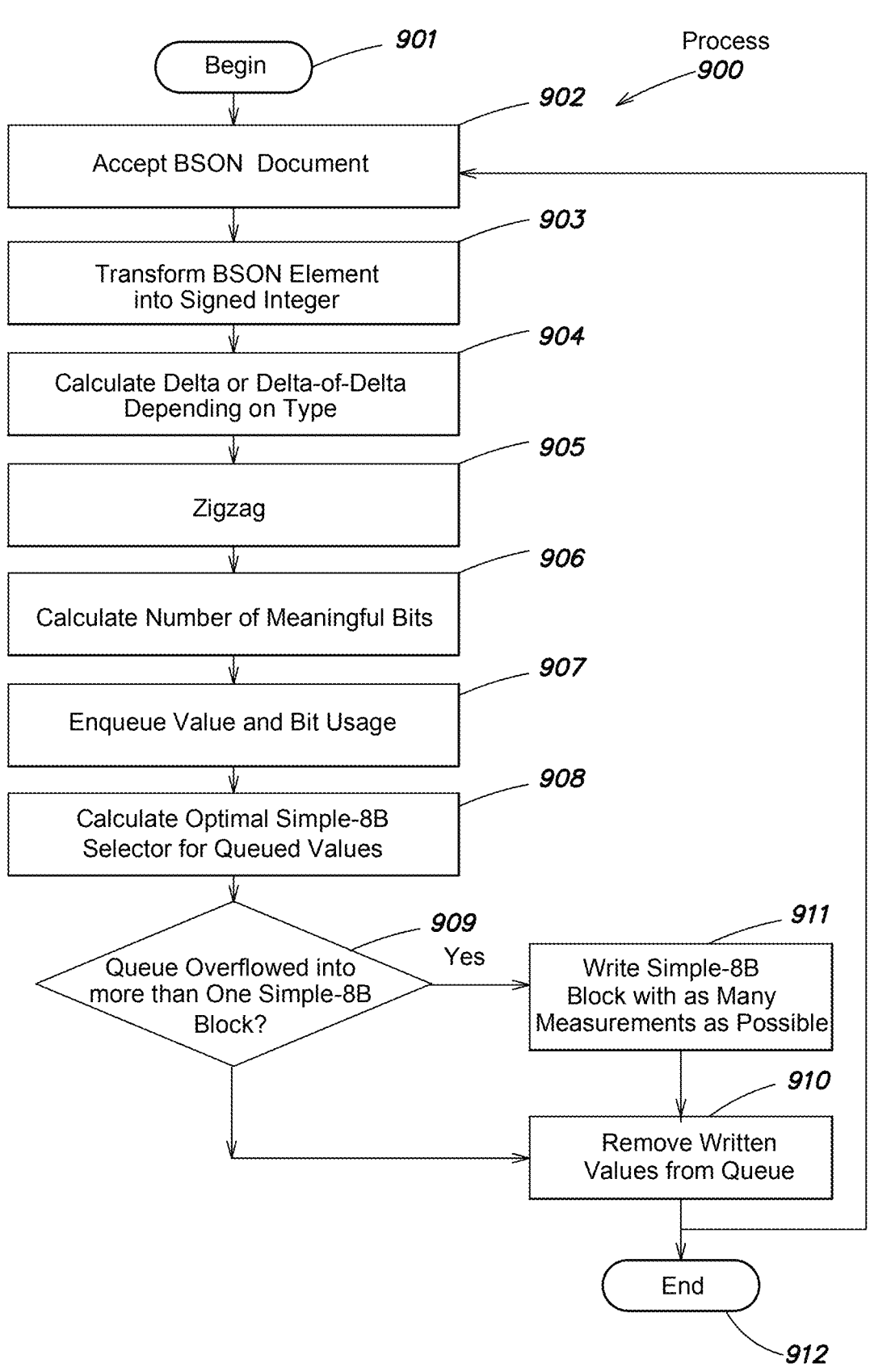
FIG. 9 is a block diagram of a process for compressing BSON document data according to various embodiments.

The following algorithm compresses measurements of a specific BSON type into Simple-8b blocks (as shown as example process 900 in FIG. 9 that begins at block 901):

1. The system accepts a BSON document (block 902)
2. Transform BSON element into signed integer (block 903)
3. Calculate delta or delta-of-delta of the BSON element depending on the BSON type (block 904)
4. ZigZag encode the delta or delta-of-delta value (block 905)
5. Calculate number of meaningful bits of the value (block 906)
6. Enqueue value and bit usage (block 907)
7. Calculate optimal Simple-8b selector for queued values (block 908)
8. If queue overflowed into requiring more than one Simple-8b block (at block 909)
   a) Write simple-8b block with as many measurements as possible (block 911)
   b) Remove written values from queue (block 910)

If no overflow is detected, queued measurements are written normally at block 910, and the written values are removed from the queue. At block 913, process 900 ends, although the process may be executed repeatedly as new documents are received and stored (e.g., generated as new timeseries data in the form of new BSON documents).

Binary Format

Just storing the Simple-8b blocks from above is not enough as the BSON type is not encoded, any delta over the Simple-8b maximum of 60 meaningful bits also needs a different encoding. In some implementations, a BSON element with an empty field name may be used that has the layout as shown in FIG. 19.

Figures 19A, 19B:
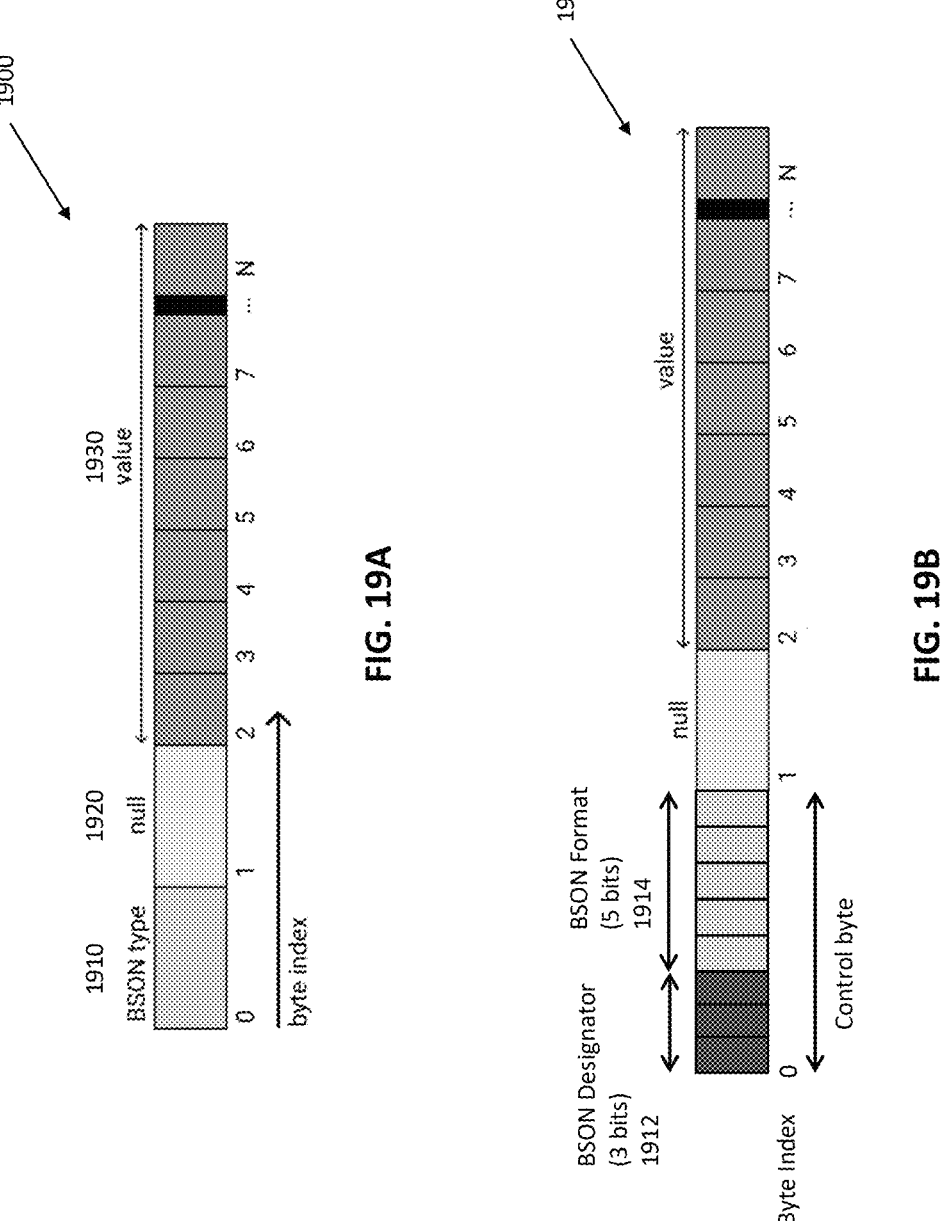
FIG. 19A shows an example stream including a BSON control byte followed by BSON elements according to various embodiments.
FIG. 19B shows an example control byte within the stream of FIG. 19A BSON element according to various embodiments.

FIG. 19A shows an example stream including a BSON control byte followed by BSON elements according to some embodiments and FIG. 19B shows an example BSON control byte within a stream according to some embodiments. This wastes just a single byte (e.g., 1920) for the field name null terminator but gives the advantage for the decoder of not having to reconstruct the BSON element as this is an internal type that maybe used by the server.

The compressed binary may begin with one of these uncompressed elements followed by compressed Simple-8b blocks where the BSON type from the previous uncompressed element may be used.

To differentiate between uncompressed elements and Simple-8b blocks a control byte with an embedded Simple-8b block count is written before the sequence.

In some embodiments, the stream 1900 may include a BSON type byte 1910 followed by value 1930. In further embodiments, the field name null terminator 1920 may also follow the BSON type byte 1910. In some embodiments, the BSON type byte may be a control byte indicating that BSON elements follow the control byte. The BSON type byte 1910 may include BSON designator bits 1912 and BSON format bits 1914. The BSON format bits may use 5 bits (e.g., element 1914) to encode the type. The BSON types may be similar to the BSON types listed in Table 2. In some embodiments, the 5 bits of the BSON format bits may encode the hexadecimal number associated with the BSON format bits as shown in the BSON type column of Table 2. The remaining 3 bits (e.g., element 1912) may the BSON designator bits and may be used to differentiate this byte from the Simple-8b block control byte. In some embodiments, the system may use reference table, Table 8, to differentiate the BSON type byte from the Simple-8b block control byte. The BSON type byte may be encoded as 0x000.

Figure 20:
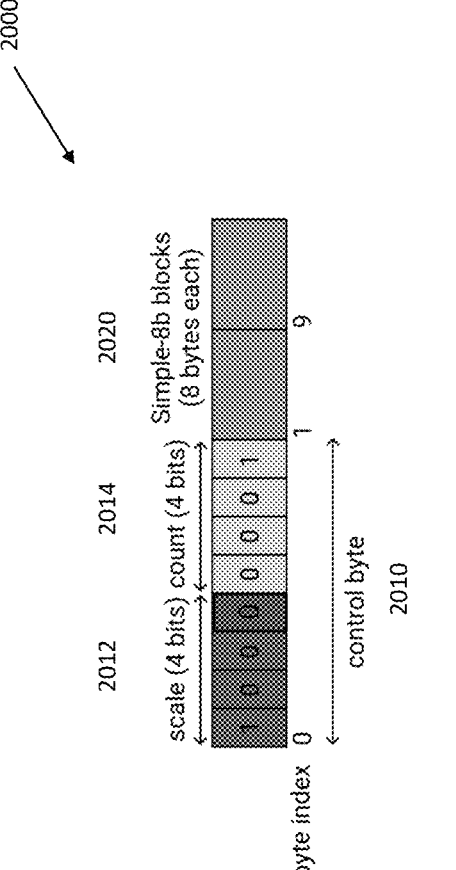
FIG. 20 shows an example stream including a control byte followed by Simple-8b blocks according to various embodiments.

After the last BSON element the binary continues with a new control byte that can be either a BSON type, Simple-8b control, or the stream end null terminator (BSON type EOO). The control bytes for Simple-8b blocks may be divided into two parts, as shown in FIG. 20. FIG. 20 shows an example stream 2000 including a control byte 2010 followed by Simple-8b blocks 2020, according to some embodiments. In some embodiments, the 4 least significant bits (e.g., element 2014) of the control byte 2010 may represent a count of how many Simple-8b blocks follow the control byte 2010. The control byte 2010 may be followed by one or more Simple-8b blocks. In some embodiments, the count (e.g., element 2014) may occupy 4 bits and thus the count may represent a maximum of sixteen Simple-8b blocks. For example, the count may store the block count −1 to allow for the maximum count of 15 to represent sixteen Simple-8b blocks. In some embodiments, each Simple-8b block may be 8 bytes each. The 4 most significant bits (e.g., element 2014) may be a scale identifier on how the values inside the Simple-8b blocks should be interpreted. This may be used for floating-point numbers as will be described later.

The control byte 2010 may include a scale identifier 2012. The scale identifier 2012 may occupy the 4 most significant bits. FIG. 20 shows an example of a Simple-8b control byte 2010 with the scale identifier 2012 of 0b1000. In some embodiments, a scale identifier of 0b1000 may indicate that the encoding of the integers within the Simple-8b blocks is dependent on the BSON type. In some embodiments, the scale identifier may be 0b1011 which may indicate that values are multiplied by $10^2$. In some embodiments, a reference table (e.g., Table 8) may be used to interpret the values encoded by the scale identifier 2012.

After the last Simple-8b block the binary continues with a new control byte that can be either a BSON type, Simple-8b control, or the stream end null terminator (BSON type EOO).

Handling Schema Changes

The system should be capable of handling differences in schema between measurement values. This may be an important feature for schemaless databases. Some types of schema changes are more common in applications than others so not all of them need an efficient encoding.

The two main types of schema changes that can be handled are:

1. BSON type change. The user application changed the data type for a measurement.
2. Missing measurement. The measurement is omitted by the user application.

BSON type change may be uncommon by user applications. BSON type change may be handled by finalizing current Simple-8b blocks and writing a new uncompressed BSON element containing the new BSON type. As the system is transforming the element value, depending on the type, the delta obtained may be large.

Missing measurements are more common and need an efficient encoding. In some embodiments, a special bit pattern may be used in the Simple-8b slots of all bits being set to 1 to encode that the element is missing. This bit pattern may be advantageous because:

1. It is the value furthest from zero and thus the most unlikely value to be stored.

2. Still allows for simple calculation of the number of meaningful bits required. The system may add 1 to the value before calculating the number of leading bits to be accurate.

Handling 16-Byte BSON Types

BSON types such as ObjectId, Decimal128, strings, binary, etc. are all larger than 8 bytes and use int128 math for the integer transformation, delta calculation, and zigzag encoding steps.

When deltas are calculated for these types, the change between measurements may have occurred in the more significant bytes resulting in a large delta with a large number of trailing zeros.

Figure 21:
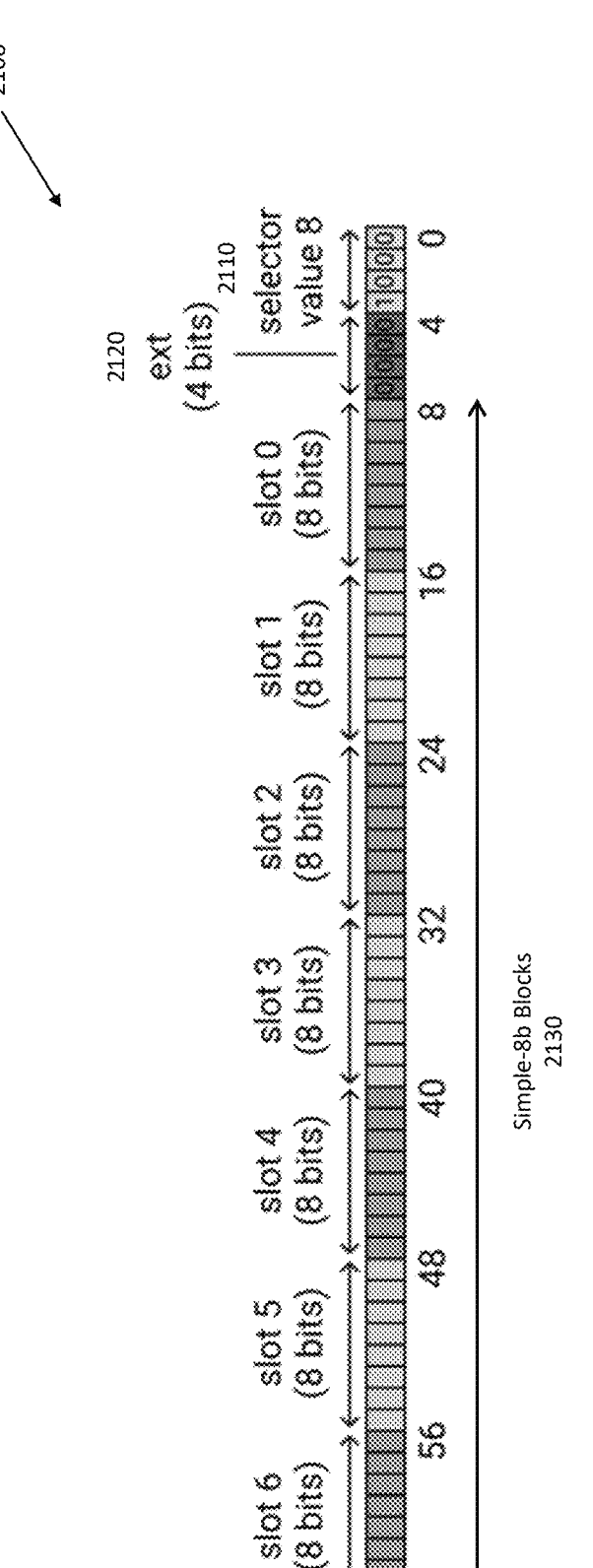
FIG. 21 shows an example Simple-8b block including two Simple-8b selectors according to various embodiments.

To allow for efficient encoding, two Simple-8b selectors may be used. In some embodiments, each of the two Simple-8b selectors may occupy 4 bits, as shown in FIG. 21. FIG. 21 shows an example of a Simple-8b block 2100 including two Simple-8b selectors, according to some embodiments. The Simple-8b block 2100 may follow a control byte (e.g., 2010 of FIG. 20) or may follow another Simple-8b block. In some embodiments, a first Simple-8b selector may encode a selector 2110. The second Simple-8b selector may encode an extension 2120. In some embodiments, the selector 2110 and the extension 2120 may determine how the remaining bits are subdivided into slots (e.g., element 2130). In further embodiments, the selector 2110 and the extension 2120 may determine the number of bits per slot and the number of bits associated with the shift.

Figure 22:
FIG. 22 shows an example Simple-8b block including two Simple-8b selectors for encoding a shift according to various embodiments.

FIG. 22 shows example Simple-8b block 2200 including two Simple-8b selectors (e.g., elements 2210 and 2220) for encoding a shift, according to some embodiments. FIG. 22 shows slots 2230 and 2240. These bits are used to increase the set of Simple-8b selectors where the Simple-8b slots 2230, 2240 have two parts.

1. Meaningful value bits (e.g., elements 2234 and 2244)

2. The number of trailing zeros removed (e.g., elements 2232 and 2234)

This allows for values like 0xF000000000000000 to be stored efficiently in Simple8B by reducing the meaningful bits from 19 to just 4 and encoding that 15 trailing zeros were removed.

FIG. 22 also shows an example of the values 0x80C00000 and 0x70 stored in a single Simple-8b block using selector 8 with extension 6. In some embodiments, one or more reference tables, such as Tables 5-7, may determine how the remaining bits are subdivided into slots and may determine other information relating to the remaining bits. For instance, using the example of FIG. 22, a selector of 8 with extension 6 may be encoded by elements 2210 and 2220 respectively. In accordance with Table 6, FIG. 22 has two slots with each slot containing 28 bits. The slots 2230, 2240 may include 24 bits to store the meaningful value bits. The slots 2230, 2240 may also include 4 bits to store the shift. The shift may include the number of trailing zeros which were removed from the value stored in the meaningful value bits.

Tables 5-7 may be used to determine how the remaining bits are subdivided into slots and may also be used to determine other information relating to the remaining bits. For instance, the reference tables such as Tables 5-7 may include the number of bits per slot, the number of bits storing the meaningful value bits, the number of bits used for the shift, or the padding bits.

24

TABLE 5

An example reference selector table for a selector of 7.
Selector: 7 (regular bitshift)

| Extension value | 0 | 1 | 2 | 3 | 4 | 5 | 6 | 7 | 8 | 9 |
|---|---|---|---|---|---|---|---|---|---|---|
| Num slots | * | 9 | 8 | 7 | 6 | 5 | 4 | 3 | 2 | 1 |
| Bits/slot | * | 6 | 7 | 8 | 9 | 11 | 14 | 18 | 28 | 56 |
| Bits for value | * | 2 | 3 | 4 | 5 | 7 | 10 | 14 | 24 | 52 |
| Bits for shift | * | 4 | 4 | 4 | 4 | 4 | 4 | 4 | 4 | 4 |
| Padding bits | | 2 | 0 | 0 | 2 | 1 | 0 | 2 | 0 | 0 |

TABLE 6

An example reference selector table for a selector of 8.
Selector: 8 (nibble shift)

| Extension value | 0 | 1 | 2 | 3 | 4 | 5 | 6 | 7 |
|---|---|---|---|---|---|---|---|---|
| Num slots | * | 7 | 6 | 5 | 4 | 3 | 2 | 1 |
| Bits/slot | * | 8 | 9 | 11 | 14 | 18 | 28 | 56 |
| Bits for value | * | 4 | 5 | 7 | 10 | 14 | 24 | 52 |
| Bits for shift | * | 4 | 4 | 4 | 4 | 4 | 4 | 4 |
| Padding bits | | 0 | 2 | 1 | 0 | 2 | 0 | 0 |

TABLE 7

A continuation of the example reference selector
table of Table 6 for a selector of 8.
Selector: 8 (nibble shift)

| Extension value | 8 | 9 | 10 | 11 | 12 | 13 |
|---|---|---|---|---|---|---|
| Num slots | 6 | 5 | 4 | 3 | 2 | 1 |
| Bits/slot | 9 | 11 | 14 | 18 | 28 | 56 |
| Bits for value | 4 | 6 | 9 | 13 | 23 | 51 |
| Bits for shift | 5 | 5 | 5 | 5 | 5 | 5 |
| Padding bits | 2 | 1 | 0 | 2 | 0 | 0 |

Handle Large Number of Identical Values

Figure 23:
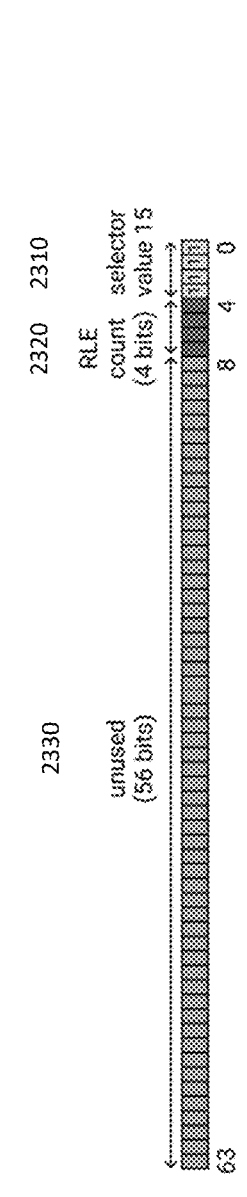
FIG. 23 shows an example of a Simple-8b block used for RLE according to various embodiments.

There is one Simple-8b selector value left that may be used for run-length-encoding in the case where there are a large number of identical values. FIG. 23 shows an example of the Simple-8b block 2300 used for RLE, according to some embodiments. In some embodiments, the Simple-8b block 2300 may include two Simple-8b selectors with each selector occupying 4 bits. In some embodiments, a first Simple-8b selector 2310 may indicate how the remaining bits of the Simple-8b block may be divided into slots. In some embodiments, at least one value may be reserved that when encoded by the first Simple-8b selector 2310 may indicate use for RLE. A reference table (e.g., Table 1) may be used to determine whether the first Simple-8b selector encodes RLE or encodes how the remaining bits of the Simple-8b block may be divided into slots. For example, 0b1111 may be reserved to indicate RLE. The second Simple-8b selector 2320 may be used to indicate how many times the previous value was repeated. In some embodiments, the second Simple-8b selector 2320 may be used to indicate the number of times the previous value was repeated as a factor of N times. In some embodiments, N may be equal to 120.

If RLE is indicated, the remaining 56 bits 2320 may be unused.

This encoding may be advantageous because:

1. Allows calculations of the number of elements stored to just having to look at the first byte (this is also true for all other Simple-8b selectors)

2. Do not need to fit the repeated value in the remaining 56 bits, which gives more flexibility.

3. 120*16=1920 is a lot of measurements to be stored in a single 64 bit value.

For 8 byte types, this is more than a 99.9% compression rate.

Floating-Point Compression

The binary layout of floating points makes them typically difficult to compress. The exponent and mantissa are separated so just bit-casting and calculating delta with integer subtraction or XOR yields limited results as the resulting integer is likely to have a large number of meaningful bits. This strategy makes it unsuitable for storage in Simple-8b blocks. One way to cope with this is to use a separate encoding for floating point values (e.g., like the encoding used by Gorilla) (Pelkonen, T., Franklin, S., Teller, J., Cavallaro, P., Huang, Q., Meza, J., and Veeraraghavan, K. (2015). Gorilla: a fast, scalable, in-memory time series database. VLBD Endowment 8 (12), 1816-1827. https://doi.org/10.14778/2824032.2824078).

However, it is appreciated that for time-series data floating-point data is often a decimal with a fixed amount of precision beyond the decimal separator instead of being a real number. The system can take advantage of this by scaling the decimal to get rid of the decimal separator and rounding to the closest integer.

In some embodiments, the system scales the floating-point number as little as possible and have the following algorithm to transform to integer.

```
for (scale in [1, 10, 100, 10000, 100000000]):
    scaled:=fp*scale
    rounded:=round (scale)
    if (rounded/scale==fp)//make sure can reconstruct
        original return rounded
return FAILED
```

If it is not possible to scale the floating-point, the system can fall back to bit cast to integer and store in Simple-8b if possible. Otherwise, the value is stored as an uncompressed BSON element.

When storing floating points like this, in some embodiments, the system also stores the scale used. This scale information may be embedded into the control byte that precedes the Simple-8b blocks. Table 8 shows a control byte reference table which, in some embodiments, the system may use to store the scale information embedded into the control byte. In some embodiments, the control byte reference table may also be used differentiate between a BSON element and a Simple-8b block.

TABLE 8

A control byte reference table

Control byte reference

| Operation | Bit count and meaning | | |
|---|---|---|---|
| | Control | Data | Notes |
| Literal | 000 | 5 bit BSON type | BSONElement with empty field name. Byte is the first byte in the encoded BSONElement. |
| Binary data stream Simple-8b blocks | 1000 | 4 bit count (1-16) for number of simple-8b blocks in binary stream | Integer-based encoding within the Simple-8b slot dependent on BSON type. |

TABLE 8-continued

A control byte reference table

Control byte reference

| Operation | Bit count and meaning | | |
|---|---|---|---|
| | Control | Data | Notes |
| Binary data stream Simple-8b blocks Scale factor: 0 | 1001 | 4 bit count (1-16) for number of simple-8b blocks in binary stream | Index is incremented on every encoded value. For double BSON type only. Values are multiplied with 100 and rounded to the nearest integer. |
| Binary data stream Simple-8b blocks Scale factor: 1 | 1010 | 4 bit count (1-16) for number of simple-8b blocks in binary stream | As 0b1001. Values are multiplied with $10^1$. |
| Binary data stream Simple-8b blocks Scale factor: 2 | 1011 | 4 bit count (1-16) for number of simple-8b blocks in binary stream | As 0b1001. Values are multiplied with $10^2$. |
| Binary data stream Simple-8b blocks Scale factor: 4 | 1100 | 4 bit count (1-16) for number of simple-8b blocks in binary stream | As 0b1001. Values are multiplied with $10^4$. |
| Binary data stream Simple-8b blocks Scale factor: 8 | 1101 | 4 bit count (1-16) for number of simple-8b blocks in binary stream | As 0b1001. Values are multiplied with $10^8$. |

In some implementations, the algorithm of storing floating-points is more complicated than for other BSON types because of this scaling. Depending on the incoming values to compress, the current control byte may be finalized and a new control byte with different scaling may be started.

Figure 10A:
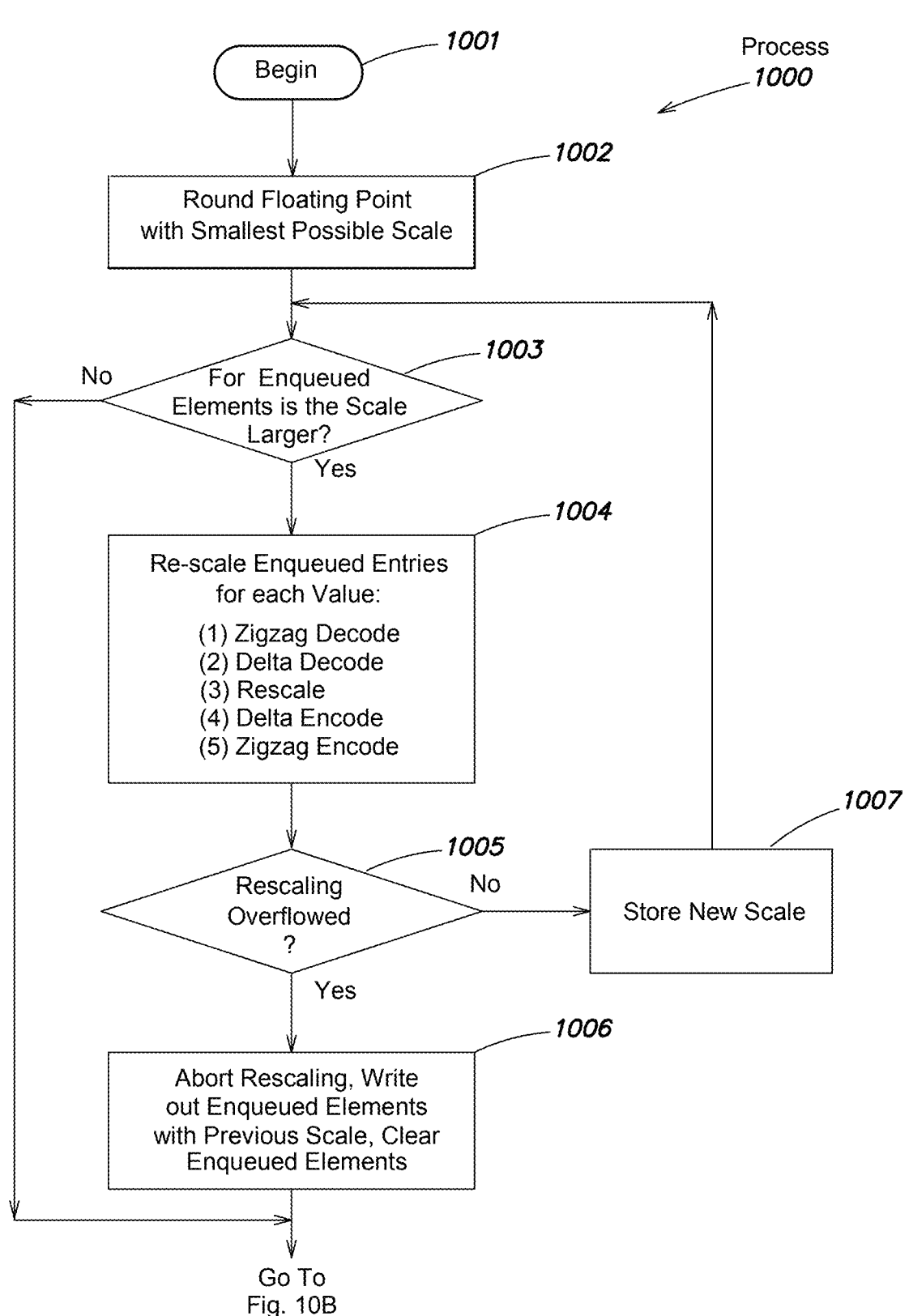
FIGS. 10A-10B show an example process for compressing floating point data according to various embodiments.
Figure 10B:
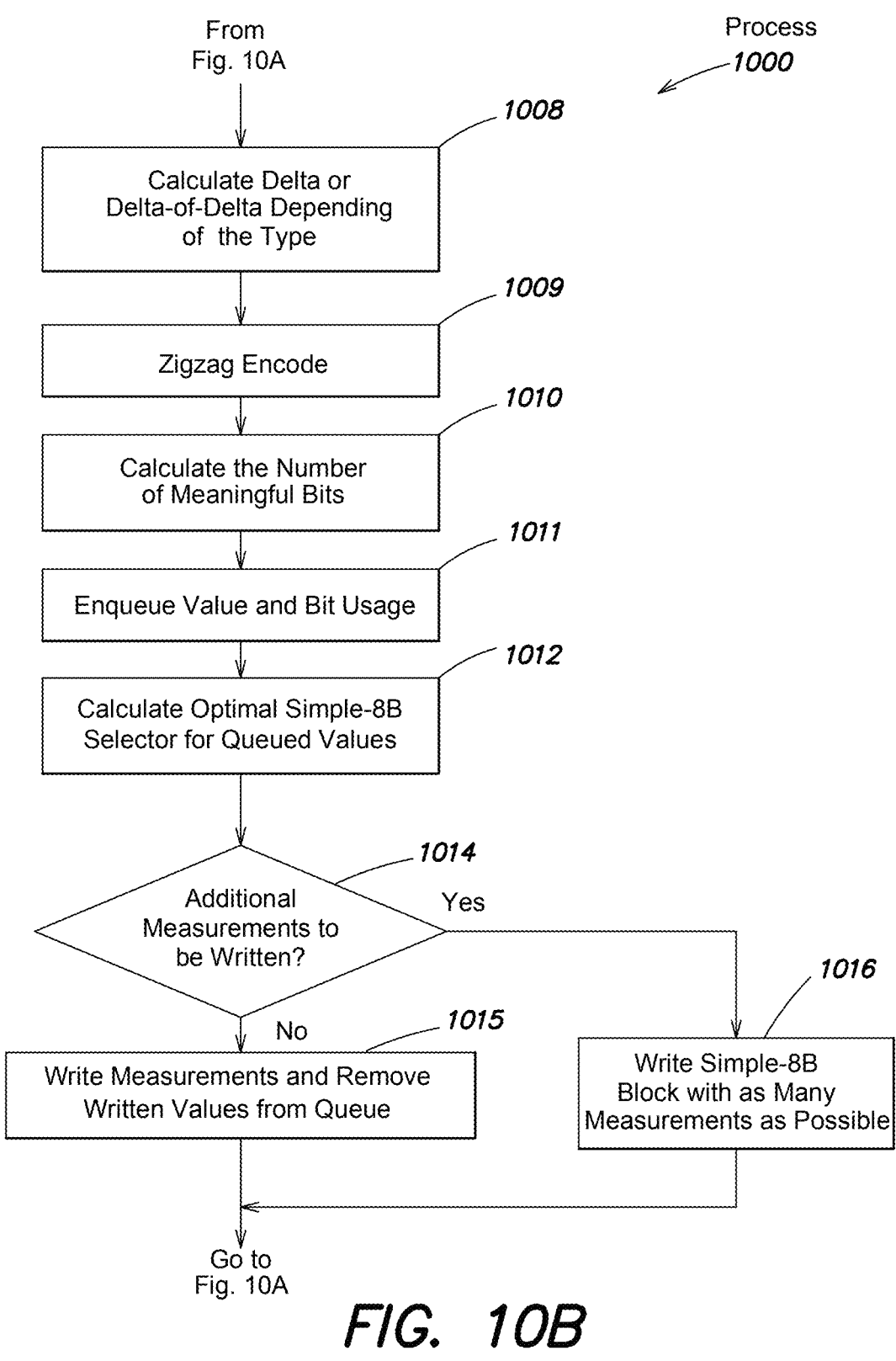

The full algorithm (as shown by way of example process 1000 in FIGS. 10A-10B) is as follows:

1. Round received floating point with smallest possible scale (block 1002)

2. If the scale determined for the received floating point is larger than one used for enqueued elements (as determined at block 1003)

a. Re-scale enqueued with new scale (at block 1004), for each value:

i. ZigZag decode ii. Delta decode iii. Re-scale, which may be performed by changing the control byte encoding iv. Delta encode v. ZigZag encode b. If re-scaling overflowed Simple-8b (e.g., at block 1005)

i. Abort re-scaling and write out enqueued elements with the previous scale (at block 1006) and clear enqueued elements c. Store new scale (at block 1007)

3. Calculate delta or delta-of-delta depending on the type (block 1008)

4. ZigZag encode (block 1009)

5. Calculate the number of meaningful bits (block 1010)

6. Enqueue value and bit usage (block 1011)

7. Calculate optimal Simple-8b selector for queued values (block 1012)

8. If there are additional measurements to be written (e.g., as determined at block 1014)

a. Write simple-8b block with as many measurements as possible (block 1016)

b. If not, write any remaining measurements and remove written values from queue (block 1015)

9. Process 1000 may be executed repeatedly as new floating-point values are received and stored (e.g., generated as new timeseries data).

Compression of Values Across Documents

Figure 11A:
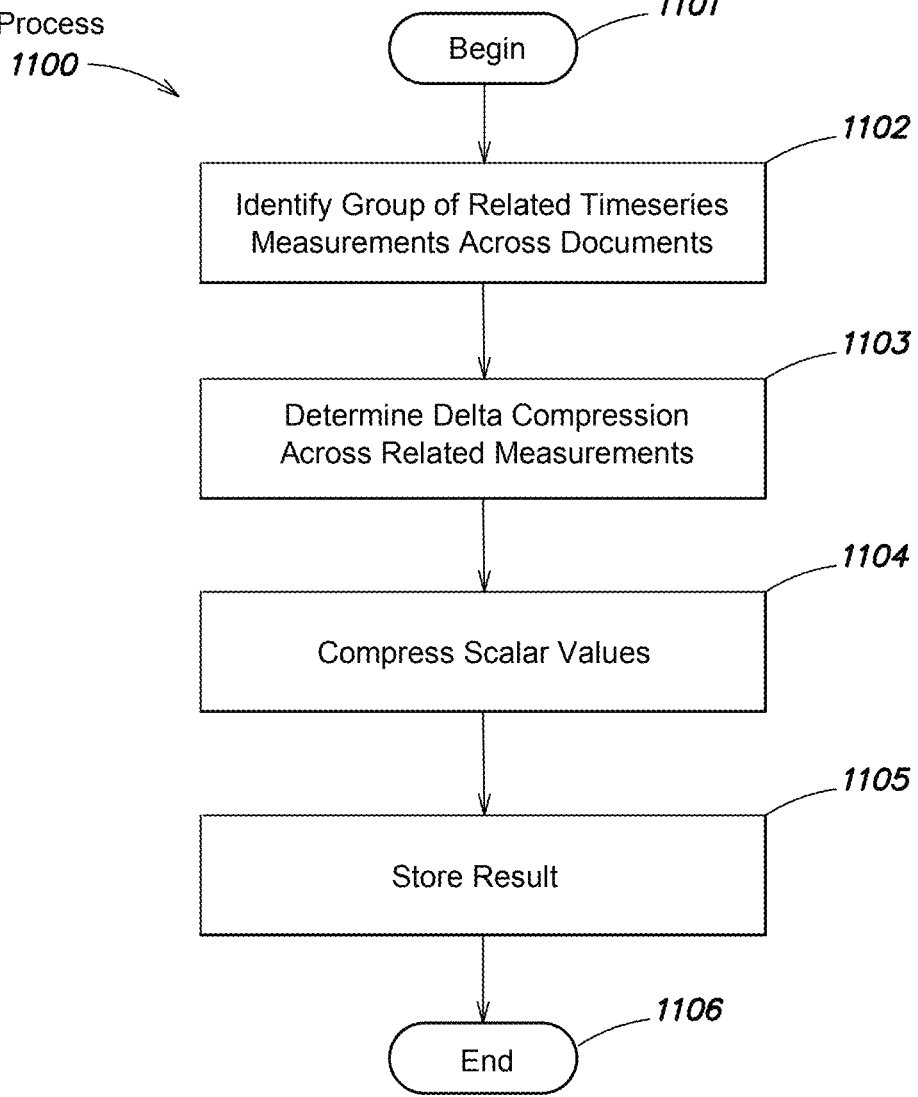
FIG. 11A shows another example process for compressing timeseries data according to various embodiments.

In some embodiments, it is appreciated that some measurements, although created at different times and stored among different documents, can be compressed and stored together, and as a result, compression is more efficient. FIG. 11A shows an example process 1100 for compressing time-series data according to various embodiments. At block 1101, process 1100 begins. At block 1102, the system identifies a group of related timeseries measurements across documents. These may be, for example, successive measurements of similar values over time, may be documents/ measurement stored within the same bucket, and/or any other relation. At block 1103, the system determines a delta compression of the values across related measurements. At block 1104, scalar values of the measurements are compressed, and the result is stored within the document database at block 1105. At block 1106, process 1100 ends, although process 1100 may be continuously performed as new timeseries measurements are received and stored.

Object/Array Compression

As discussed above, the system may implement a binary format for compressing time-series data of scalar values. To conform with a document-based database having a flexible schema, users need to be able to create hierarchies and group measurements together in objects while still getting the benefits of compression. When treating objects as a group of measurements, the system may delta compress or delta-of-delta compress the same measurement value across objects and not calculate deltas within objects as the deltas within objects may not correlate as a time-series.

According to some embodiments, instead of identifying scalar measurements by name, scalar measurements may be identified using their path within the objects. In further embodiments, rather than calculating a single delta, the system may calculate deltas for every scalar sub-field in the measurement object and may store multiple deltas for a measurement. FIG. 11B shows one example process 1110 that may be used to compress and encode multiple time-series measurements. At block 1111, process 1110 begins.

At block 1112, the system identifies groups of related timeseries measurements across documents. For instance, such documents may be generated over a period of time and may contain similar measurements (e.g., temperature at a location). At block 1113, the system identifies at least one scalar measurement across multiple documents according to a path within the object. The system determines or calculates, at block 1114, deltas for every subfield in the measurement object.

In some embodiments, it is appreciated that data may be interleaved by control bytes. In particular, at block 1115, the system may interleave data from the subfields by control byte. The system writes, at block 1116, a control byte start (indicating that the interleaved data begins), writes the interleaved data, and then writes a control byte end identifier that indicates the end of the compressed output. At block 1117, process 1110 ends.

Interleaving Example

In some embodiments, the system may interleave data. In the following example "a", "b.c", "b.d" are scalar fields with calculated deltas.

```
{"a": 1,
    "b": {"c": "str",
        "d": 2.0}}
```

Interleaving may use control bytes and streams of Simple-8b blocks to store data for individual measurements. In some embodiments, an encoding is used to store multiple measurements. Data for a single sub-field may be stored in a contiguous block followed by the data for the next sub-field and so on. However, this approach has a couple of drawbacks:

1. Offset to where the data for a particular sub-field starts needs to be encoded (taking up extra space)

2. The system may read almost the entire binary to decompress the first measurement.

In some embodiments, data is interleaved from the sub-fields by using control byte. A fixed traversal order may be established using depth-first order on the first object that is stored uncompressed. The decompressor may use this order to read data. The decompressor maintains state in memory per sub-field to keep track of the decoding position of the current control byte it is reading. When a control byte is extinguished of values to decompress, the next unread control byte for this sub-field.

The compressor can write this layout by using a min-heap to interleave control bytes from sub-fields:

```
min_heap<numValuesWritten, subFieldIndex> h
// Initialize heap
for i in [0, numSubfields]:
    h.push_heap({0, i})
while not h.empty( )
    [numwritten, subFieldIndex]=h.pop_heap( )
    controlToWrite=getNextControlForIndex(subFieldIn-
        dex)
    if controlToWrite:
        numWritten+=numValuesInControl(controlToW-
            rite)
        writeControlInBinary(controlToWrite)
        h.push_heap({numWritten, subFieldIndex})
```

The binary for object compression may begin with a full uncompressed object. To differentiate the uncompressed object from a regular uncompressed object without the object compression mode, the object may be preceded with a unique control byte.

In some embodiments, a control byte may indicate entering interleaved mode, as shown in Table 9. Table 9 shows an example of a control byte reference table. The reference table may include an encoding for entering interleaved mode for sub-object compression without array support, entering interleaved mode for sub-object compression with array support, and entering interleaved mode for sub-object compression without array support and the reference object is of an array type.

TABLE 9

An example control byte reference table that encodes for interleaved mode.

| Operation | Control byte | Notes |
|---|---|---|
| Enter interleaved mode for sub-object compression without array support | 0xF0 | May not be used when already in interleaved mode. BSONObj follows as reference in interleaved mode. See below for design. EOO byte exits interleaved mode |

TABLE 9-continued

An example control byte reference table that encodes
for interleaved mode.

| Operation | Control byte | Notes |
|---|---|---|
| Enter interleaved mode for sub-object compression with array support | 0xF1 | As above but supports arrays |
| Enter interleaved mode for sub-object compression with array support and reference object is of array type | 0xF2 | As above but the reference object is treated as an array |

The object compression mode may end when a 0x0 control byte is encountered at the first sub-field when it is reading the next control byte from the binary.

BSON Arrays may have the same data layout as BSON Objects. The field names of BSON Arrays and BSON Objects may be stringified indexes.

Figure 24:
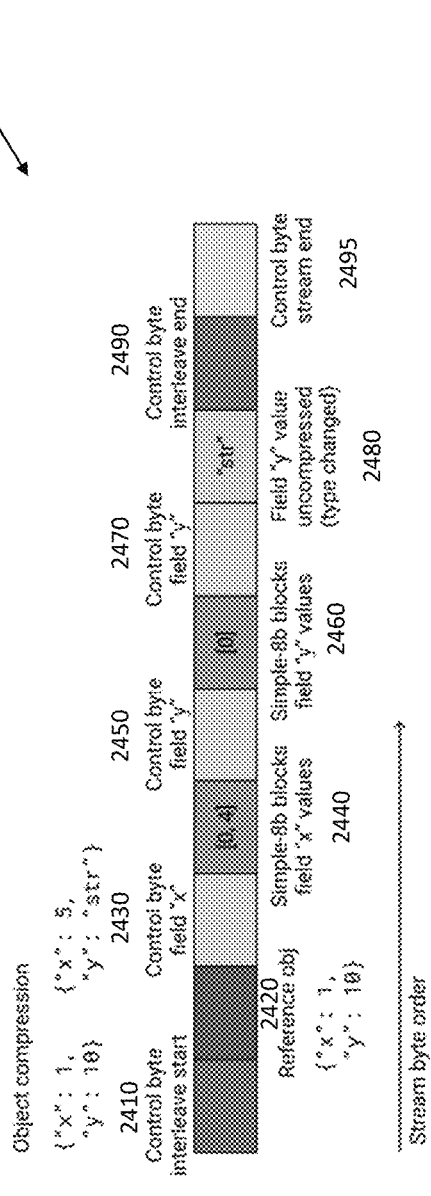
FIG. 24 shows an example of interleaving data according to various embodiments.

FIG. 24 shows an example of interleaving data according to some embodiments. In some embodiments, object compression using interleaving may be performed on documents stored within the same bucket. The stream 2400 may begin with a control byte 2410 indicating interleave start. The reference object 2420 may follow the control byte 2410. The reference object 2420 may establish the field order. In this exemplary embodiment, the field order of "x", "y" is established within reference object 2420, each with a sub-stream containing two values. After the reference object 2420, the first interleaved control byte 2430 may be written for the first field of the reference object 2420. For example, the first interleaved control byte 2430 may be written for field "x" containing the two deltas for "x". The two deltas, according to some embodiments, may be stored within Simple-8b blocks 2440. The next control byte 2450 may be written for the second field of the reference object 2420. The control byte 2450 may be written for the next field "y". Because of the type change, one value is written in Simple-8b blocks 2460. In this example, the third control byte 2470 also belongs to field "y" because "x" has written 2 values where "y" has just written one. Following the third control byte 2470, the field "y" value may be stored as an uncompressed value 2480. A decoder would have distinguished values for "y" and has to read in the next control byte whereas a second value can be read from the first control byte for "x".

In some embodiments, the bucket may indicate the number of measurements or values (including missing values) within each field. In this example, the count may be 2. Using the count of 2, the decoder may distinguish field "x" from field "y" since field "x" has 2 values. Thus, the second control byte 2460 belongs to field "y". Further, the count of 2 may be used to determine that the third control byte 2470 belongs to field "y" since field "y" has one written value. To indicate the end of interleave, a control byte 2490 may be used. In some embodiments, to indicate the end of a stream, another control byte 2495 may be used which may follow control byte 2490.

Missing Values within Object Compression

The binary format for compressing the individual sub-fields uses a similar encoding as regular time-series compression outside of object compression. The Simple-8b blocks use slots with the bit pattern set to all 1s.

However, as the object after the object compression starts control byte is used to determine the number of interleaved streams in the binary.

For example, if the following two values were repeated, there is no one full measurement of all fields that could be used to describe all the interleaved streams.

{"a": 1, {"a": 1
   "b": 2.0} "c": 2}

Thus, the compressor may buffer a few objects and inspects the objects to see if any new fields are present. If any new field is present, the new field is merged into a new object that preserves the order and structure of previous objects. In the example below, a merged object may include three fields.

{"a": 1,
"b": 2.0
"c": 2}

When reading the first value the merged object may be combined with the first value in each interleaved sub-stream. This value can be either 0 for the field existing in the first measurement or the missing bit pattern that excludes the field.

The result may be sub-object compression with three interleaved streams as-if the measurements were compressed with the following objects.

{"a": 1, {"a": 1,
   "b": 2.0, "b": <missing>,
   "c": <missing>} "c": 2}

Schema Differences not Encodable with Object Compression

In some embodiments, if some object compression for a specific case is not encodable, current object compression may end and a new object compression with a new reference object may be started.

Field order mismatch

{"a": 1, {"a": 1,
   "b": 2, "c": 2,
   "c": 3} "b": 3}

In some embodiments, objects may not have the same field order. In the above example a first object may have a field order of "a", "b", then "c" and a second object may have a field order of "a", "c", then "b". In some embodiments, the field order of one object may be rearranged to match the field order of the other object. For instance, the field order of the second object may be rearranged to "a", b", then "c" to match the first object. After rearranging the field order, the objects may be compressed. In an alternative embodiment, objects with mismatched field orders may not be compressed. This may preserve the field order of the object in cases when the user may rely on the particular field order. In some embodiments, the first object may be a compressed object. If the first object and the second object do not have the same field order, the first object compression may end and a second object compression may be started. The second object compression may include a new reference field including the field order of the second object.

In some embodiments, the system may implement one or more of the following features (either alone or in combination with any other feature):

Implement delta compression for BSON element values of at most 16 bytes, and delta-of-delta compression for integers.

For non-numeric data, if the value size is unchanged and only a single byte of the value itself is changed, the delta should be much less than 16 bytes in size.

Support the compression for newly inserted time-series data

Support decompression in $_internalUnpackBucket.

Use a variable length encoding, such as a variation of Simple8B, for delta representations.

Implement run-length encoding (RLE) for repeating values, deltas and missing values.

Implement RLE for all BSON types, not just numerical data.

Missing values allow repeating the last non-missing value/delta by reference.

Allow schema changes at the cost of storing a literal copy of the metric with the changed schema.

Missing fields not considered schema changes.

Compress columns of documents: {cpu: {idle: 0.0, system: 0.2, user: 99.8}}.

If there are many of these documents, each subfield is compressed as its own column.

Compress sequences of documents with alternating subfields:

[{cpu: {idle: 0.0}}, {cpu: {system: 0.2}}, {cpu: {user: 99.8}}, {cpu: {idle: 0.0}}, . . . ]

Add validate hook that validates that compression/uncompression of arbitrary data without data loss BSON Binary Subtype 7 Specification BSONColumn using BSON Binary subtype 7 may be used to represent an array format for compact storage for timeseries columns.

Field names may not be stored unlike BSONObj and BSONArray

Missing elements may not be allowed unlike BSONArray.

Delta compressed BSON element values.

BSON type specific binary encodings.

The binary may be encoded as a binary stream with an operation byte that describes the count of the bytes following and their meaning. The stream may finish with a literal BSONElement of BSON type EOO.

The first value may be stored as a literal BSONElement followed by either a binary data stream of delta encoded values or another literal if delta encoding is not possible. In some embodiments, the first value may be a control byte. The BSONColumn starts at index 0 and is incremented for every stored literal, delta encoded or skipped value.

The delta values may be relative to the previous existing value, either a literal or previous delta. When an index skip is encoded, the index skip does not affect previous existing value or any delta encoded after. In some embodiments, the index skip may indicate for a decoder to increment the index.

TABLE 10

An example control byte reference table.

| Operation byte | | | |
| --- | --- | --- | --- |
| | Bit count and meaning | | |
| Operation | Control | Data | Notes |
| Literal | 000 | 5 bit BSON type | BSONElement with empty field name. Byte is the first byte in the encoded BSONElement. |
| Binary data stream Simple-8b blocks | 1000 | 4 bit count (1-16) for number of simple-8b blocks in binary stream | Integer-based encoding within the Simple-8b slot dependent on BSON type. Index is incremented on every encoded value. |

TABLE 10-continued

An example control byte reference table.

| Operation byte | | | |
| --- | --- | --- | --- |
| | Bit count and meaning | | |
| Operation | Control | Data | Notes |
| Binary data stream Simple-8b blocks Scale factor: 0 | 1001 | 4 bit count (1-16) for number of simple-8b blocks in binary stream | For double BSON type only. Values are multiplied with $10^0$ and rounded to the nearest integer. |
| Binary data stream Simple-8b blocks Scale factor: 1 | 1010 | 4 bit count (1-16) for number of simple-8b blocks in binary stream | As 0b1001. Values are multiplied with $10^1$. |
| Binary data stream Simple-8b blocks Scale factor: 2 | 1011 | 4 bit count (1-16) for number of simple-8b blocks in binary stream | As 0b1001. Values are multiplied with $10^2$. |
| Binary data stream Simple-8b blocks Scale factor: 4 | 1100 | 4 bit count (1-16) for number of simple-8b blocks in binary stream | As 0b1001. Values are multiplied with $10^4$. |
| Binary data stream Simple-8b blocks Scale factor: 8 | 1101 | 4 bit count (1-16) for number of simple-8b blocks in binary stream | As 0b1001. Values are multiplied with $10^8$. |
| Enter interleaved mode for sub-object compression | 1111 | 0000 | May not be used when already in interleaved mode. BSONObj follows as reference in interleaved mode. See below for design. EOO byte exits interleaved mode |
| Enter interleaved mode for sub-object compression with array support | 1111 | 0001 | As above but supports arrays |
| Enter interleaved mode for sub-object compression with array support and reference object is of array type | 1111 | 0010 | As above but the reference object is treated as an array |

All unspecified Control values may be reserved for future use.

Binary Data Stream Encoding Using Simple-8b with RLE

Simple-8b is an encoding to pack multiple small integers into a single 64 bit word. The fewer bits required to represent the integers the more of them can be packed into a single block. The encoding is therefore suitable for storing delta and delta-of-delta values of measurements that do not change rapidly, as these values may be close to zero and can be represented with just a few bits.

Simple-8b uses may use 4 bits to describe how the remaining 60 data bits are divided into slots. Every slot may then store a single integer padded with zeros if all bits are not needed. These 4 bits may be referred to as the selector value or the Simple-8b selector. One selector may be used to implement run length encoding (RLE) which uses the available bits differently.

Table 11 shows an example Simple-8b selector reference table to determine the subdivision ranges of the remaining 60 bits based on the selector value chosen. A selector value may be associated with a number of slots and the number of bits per slot. The selector value may also encode for a RLE.

TABLE 11

| An exemplary Simple-8B selector reference table for determining subdivision ranges of the remaining 60 bits. | | | | | | | | | | | | | | | |
|---|---|---|---|---|---|---|---|---|---|---|---|---|---|---|---|
| Selector value | 0 | 1 | 2 | 3 | 4 | 5 | 6 | 7 | 8 | 9 | 10 | 11 | 12 | 13 | 14 | 15 RLE |
| Num slots | — | 60 | 30 | 20 | 15 | 12 | 10 | 8 | 7 | 6 | 5 | 4 | 3 | 2 | 1 | 0 |
| Bits/slot | — | 1 | 2 | 3 | 4 | 5 | 6 | 7 | 8 | 10 | 12 | 15 | 20 | 30 | 60 | 0 |
| Selector extension bits | — | 0 | 0 | 0 | 0 | 0 | 0 | 4 | 4 | 0 | 0 | 0 | 0 | 0 | 0 | 4 |

The selector bits may be stored as the four least significant bits (little endian byte order).

| Selector bits (0-3) | Extension/Data (4-7) | Data bits (8-63) |
|---|---|---|

Selector value 15 (0b1111) may be used to indicate run-length-encoding (RLE). In this case, the 4 extension bits represent a 4 bit count, which will be discussed in further detail later. In some embodiments, if the selector indicates RLE, then the 4 extension bits may represent the number of times the previous value is repeated (count+1)*120 times. The remaining 7 bytes/56 bits are unused. The previous value can be an uncompressed literal if the first Simple8b block in the stream is RLE.

| RLE selector 0b1111 (0-3) | Count (4-7) | Unused (8-63) |
|---|---|---|

The bit pattern of all bits in a slot being set to '1' may represents index skip/missing value. Values with an all '1' representation ($2^N-1$) may be to be stored with an additional bit to ensure there are at least one padded 0. For example, the value $2^3-1=7$ needs to be stored as 0b0111 because 0b111 would be interpreted as skip. In some embodiments, selector 1 may only store unchanged (0b0) or skip (0b1).

In some embodiments, all available slots for a given selector must be used as there is no encoding for unused slots, which would sacrifice another bit pattern (on top of the reserved one for index skip).

Extended Selectors

Encoding large numbers with many trailing zeros is inefficient with the regular Simple-8b selectors because many bits will be required. In some embodiments, the Simple-8b block may include a control byte. The control byte may have a selector of 4 bits. The four bits left over of the control byte may be used to specify an extended range of selectors. The control byte may help define the use of slots where some bits are used to describe a right bit shift to remove trailing zeros. In some embodiments, this shift may be similar to the shift 2242 and 2232 shown in FIG. 22. Extension value 0 encodes that the regular Selector 7 or 8 as specified above is used. Unused extension values are reserved for future use. The padding bits should be set to zero.

The extended Selector 7 may encode an absolute bit shift whereas the extended Selector 8 may encode a bit shift in half-bytes (nibbles). Having selectors with a nibble shift is important for 16 byte data types that may have a large amount of trailing zeros when represented as a delta.

Tables 12-14 may be used to determine how the remaining bits are subdivided into slots and may also be used to determine other information relating to the remaining bits.

For instance, the reference tables (e.g., Tables 5, 6, and 7) may include the number of bits per slot, the number of bits storing the meaningful value bits, the number of bits used for the shift, or the padding bits.

Within a slot the least significant bits may be used for the value and the most significant bits may be used for the bit shift amount.

| Selector 7 (0-3) | Extension value (4-7) | Data | Shift | Data | Shift | Padding (last bits) |
|---|---|---|---|---|---|---|

The bit pattern of all '1' bits set to indicate index skip/missing value works the same for the regular selectors. All bits in both the value and bit shift must be set to '1' to indicate missing value.

Counting/Skipping Elements on Compressed Data

The first byte in every Simple-8b block may contain the necessary information to calculate how many indexes are encoded in the block without further decompression. As there are no unused slots within a word a simple lookup table may be used to lookup from the selector and extension values, as previously described.

Sub-Document Stream Interleaving

Figures 25A, 25B, 25C:
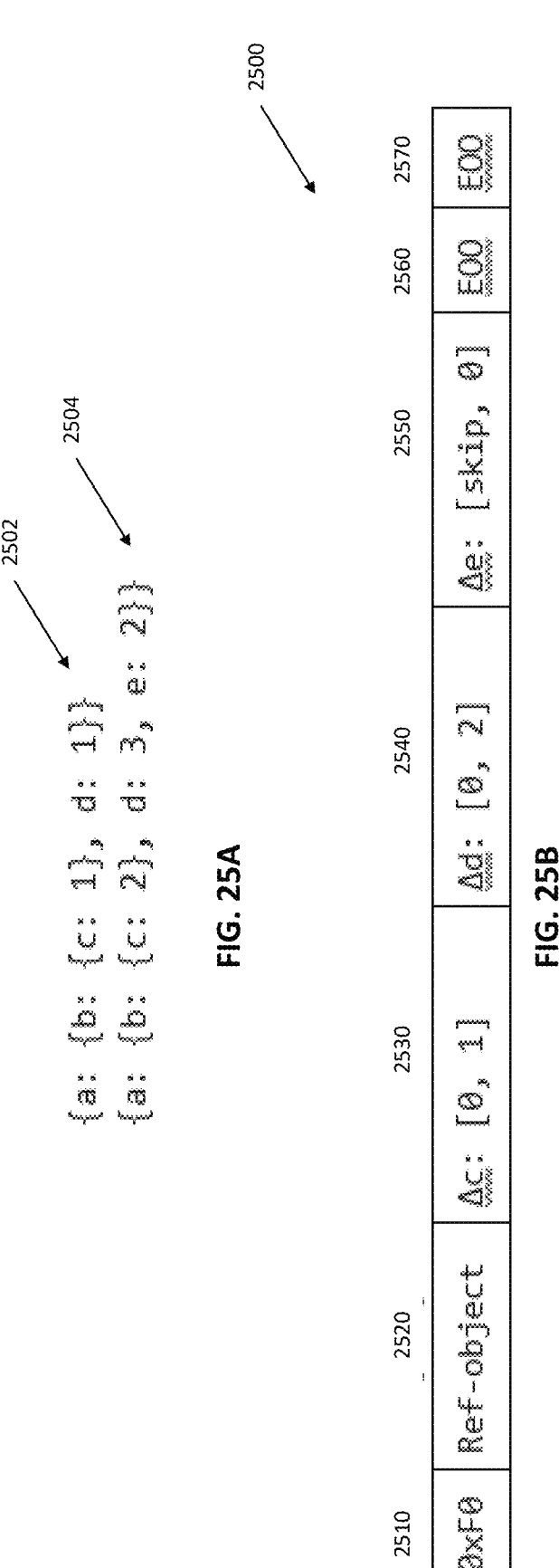
FIG. 25A shows an example of two documents according to various embodiments.
FIG. 25B shows an example of compressing the documents using interleaving according to various embodiments.
FIG. 25C shows an example ordering of scalar subfields and an example reference object corresponding to the stream of FIG. 25B according to various embodiments.

FIG. 25A shows an example of two documents according to some embodiments, FIG. 25B shows an example of compressing the documents using interleaving according to some embodiments, and FIG. 25C shows an example ordering of scalar subfields and an example reference object corresponding to the stream of FIG. 25B according to some embodiments.

To compress fields in sub-documents using the techniques described above, the stream 2500 may be interleaved with sub-streams. In some embodiments, interleaving may begin when a control byte 2510 which encodes the start of interleaving is written. Interleaving may then stop when a control byte 2560 that encodes the stop of interleaving is written. For example, when control byte 2510 is written as 0xF0, the stream may enter interleaved mode until a literal EOO 2560 is encountered which exits interleaved mode.

After the 0xF0 2510 interleaving start operation, a full BSONObj may be written. This object (e.g., the BSONObj) may be the interleaving reference object 2520 containing a similar hierarchy as the input objects and initial values from scalar subfields the first time they are encountered from the input. For example, the two documents to be compressed 2502 and 2504 may include scalar fields "c", "d", and "e". The ordering of the scalar subfields may be shown as 2506 and the reference object may be shown as 2508.

When the stream is interleaved, the stream operations from the compressed binary may belong to separate scalar subfields from the reference object that started stream interleaving. In some embodiments, the reference object (e.g., the reference object from above) may indicate a hierarchy of scalar subfields indicating that substream 2530 belongs to subfield "c", substream 2540 belongs to subfield "d", and substream 2550 belongs to subfield "e". In some embodiments, all Simple-8b blocks following a stream operation may belong to the same substream.

An order of scalar subfields from the reference object may be established using depth-first traversal. When reading an interleaved stream, the subfields may be associated with a substream and read in the established order. Every substream may keep a pointer to the current stream operation byte it is reading from. When a substream runs out of values to read, it may read the next unused stream operation from the binary stream which may belong to this subfield since reading is in a fixed order. This interleaving avoids having to write offsets where sub-streams would start in the binary.

The first value in the interleaved substreams may be a zero-delta for the subfield existing in the first user document or the skip pattern if not present in the first user document. For example, in FIG. 25B, the first value of substreams 2530 and 2540 may be a zero-delta. The first value of substream 2550 may be a skip since, document 2502 does not include scalar subfield "e". When encountering a skipped value for a subfield that subfield is omitted from the read output. If skipping subfields would result in an empty subobject, that subobject may also be omitted.

In some embodiments, a second literal EOO 2570 may be written for exiting the binary stream.

In some embodiments, if the system cannot encode a value using sub-stream interleaving, then the substreams may be flushed to the binary and a literal EOO may be written for exiting interleaved mode A new reference object may be written to restart sub-stream interleaving with the value incompatible with the previous reference object. In some embodiments, cases that may require sub-stream interleaving to end are:

New subfield not existing in reference object.
Different subfield order or hierarchy compared to reference object
Empty subobject not in reference object.
Skipped values in sub-streams may have the same encoding as in regular streams. In some embodiments, empty and missing objects may not be differentiated and may be treated similarly. If all subfields in an object are missing, the object may be interpreted as the Document being missing.

Example

An example of how the following 7 values may be encoded using sub-stream interleaving.

{a: {b: {c: 1, d: 2}, e: 1}}
{a: {b: {c: 2, d: 3}, f: 2}}
{a: {e: 1}}
{a: {e: 1}}
{a: {b: {c: 2, d: 3}, e: 2}}
{a: {b: { }, e: 2}}
{a: {b: { }, e: 3}}
0xF0 Interleave start {a: {b: {c: 1, d: 2}, e: 1, f: 2}}
//sub-streams will be started for c, d, e and f in that order.
0x81 Delta for c. Deltas: [0, 1, skip, skip, 0]
0x81 Delta for d. Deltas: [0, 1, skip, skip, 0]
0x81 Delta for e. Deltas: [0, skip, 0, 0, 1]
0x81 Delta for f. Deltas: [skip, 0, skip, skip, skip]

0x00 EOO//end sub-streams
0xF0 Interleave start {a: {b: { }, e: 2}}
//sub-stream will be started for e.
0x81 Delta for e. Delta: [0, 0, 1]
0x00 EOO//end sub-streams
0x00 EOO//end binary Signed Integers Delta values are likely to be a small integer, positive or negative. Regular encoding of negative integers using Two's complement has a large binary difference from positive integers. Two's complement is inefficient when using Simple-8b to fit as many blocks as possible in the 64 bit word. Table 15 shows the Two's complement transformation of a signed 32 bit integer into a binary representation. As seen in Table 12, the binary representation of −1 in Two's complement is 0xFFFFFFFF. It is appreciated that a method for storing signed integers using fewer bits may be more efficient when using Simple-8b.

TABLE 12

An example table of the using Two's complement to transform a signed 32 bit integer into a binary representation.
Two's complement

| Signed 32 bit integer | Binary representation |
|---|---|
| 0 | 0x00000000 |
| 1 | 0x00000001 |
| −1 | 0xFFFFFFFF |

Instead of using Two's complement, in some embodiments, a ZigZag encoding may be used (e.g., from Google protocol buffers) where the sign bit is stored as the least significant bit. ZigZag encoding may provide an efficient method of storing signed integers using Simple-8b. Table 13 shows the use of ZigZag encoding to transform 32 bit integers 0, 1 and −1 into a binary representation. In ZigZag encoding, −1 may be represented as 0x00000001, which may provide for an efficient method of storing signed integers using Simple-8b.

uint32_t zigzag=(n<<1)^(n>>31);

int32_t n=(zigzag>>1)^(~(zigzag & 1)+1);

TABLE 13

An example table of the using ZigZag encoding to transform a signed 32 bit integer into a binary representation.
ZigZag encoding

| Signed 32 bit integer | Binary representation |
|---|---|
| 0 | 0x00000000 |
| 1 | 0x00000002 |
| −1 | 0x00000001 |

Binary Encodings for BSON Types

The different BSON types may be stored in Simple-8b slots according to Table 14 or Table 2. Table 14 is a reference table of BSON types with corresponding Simple-8b value type. It should be appreciated that the BSON types may be stored in Simple-8b slots in other formats not listed in Table 14, such as delta, delta-of-delta, constant, etc., Delta and delta-of-delta types may be calculated using integer subtraction using either int64_t or int128_t and then ZigZag encoded. Detailed description per type follows.

TABLE 14

An example reference table of BSON types with corresponding
Simple-8b value type.

| BSON type | Simple-8b value type | Notes |
| --- | --- | --- |
| Double (0x01) | Delta | Double scaled and rounded to nearest integer. Fallback to interpret as integer. |
| String (0x02) | Delta | |
| Document (0x03) | N/A | Sub-field encoding |
| Array (0x04) | N/A | |
| Binary (0x05) | Delta | Size need to be unchanged and at most 16 |
| Undefined (0x06) | Constant | |
| ObjectId (0x07) | Delta-of-delta | |
| Boolean (0x08) | Delta | |
| Datetime (0x09) | Delta-of-delta | |
| Null (0x0A) | Constant | |
| Regex (0x0B) | N/A | |
| DBPointer (0x0C) | N/A | |
| Code (0x0D) | Delta | |
| Symbol (0x0E) | N/A | |
| Code w Scope (0x0F) | N/A | |
| 32 bit Integer (0x10) | Delta | |
| Timestamp (0x11) | Delta-of-delta | |
| 64 bit Integer (0x12) | Delta | |
| Decimal128 (0x13) | Delta | |

Double-Precision Floating-Point (0x01)

It is common for users to store integers as double-precision floating-point numbers or have floating-point numbers that can be represented exactly with just a few digits beyond the decimal point. In this case, the value can be multiplied with a base-10 scale factor and round to closest 64-bit integer while maintaining lossless convertibility back to double:

int64_t doubleAsInt=round $(d*10^{SCALE})$;

bool integerBasedCompressionPossible=d==double(doubleAsInt)/$10^{SCALE}$;

This integer may then be used to calculate a delta using integer subtraction.

If rounding based encoding is not possible for any available scale factor, the Double may be reinterpreted as 64-bit integer without rounding and stored with the 0b1000 operation.

Binary (0x05), Decimal128 (0x13)

Integer delta may be computed using subtraction over the 16 byte binary interpreted as int128_t. Integer delta may be stored in Simple-8b blocks with leading zeros removed.

Binary deltas may only be calculated when the size is 16 or below and when the size is unchanged. In some embodiments, a size change may require a full uncompressed literal to be written.

Integer 32 Bit (0x10)

In some embodiments, Integer 32 bit may ZigZag encoded the integer delta using integer subtraction.

Integer 64 Bit (0x12)

Integer 64 bit may ZigZag encoded the integer delta using integer subtraction, similar to Integer 32 bit. However, if the delta needs more bits than the largest Simple-8b selector can store, a literal BSONElement may be written.

Datetime (0x09)

Datetime may ZigZag encoded the integer delta-of-delta. If the delta-of-delta needs more bits than the largest Simple-8b selector can store, a literal BSONElement may be written.

String (0x02), Code (0x0D)

To store string deltas in Simple-8b blocks, string-deltas may be transformed into an unsigned integer that can be converted back to the original string without data loss. This integer should be as small as possible to allow for the greatest amount of compression. Strings that are a string representation of a number or with a number suffix may likely be used as counters. The information most likely to be changed in this scenario is in the last few bytes.

If the string is of length 16 or below (not counting null terminator), the encoder may try to make the transformation into an integer that can be delta-stored in Simple-8b. If this is not possible, the string may be stored as an uncompressed literal.

To optimize for the scenario above, the unsigned integer may be computed using reverse order of the string with the null terminator omitted. For example, the last character in the string may be represented as the least significant byte in the integer using little-endian byte order. No size is stored, which works as long as there are no leading NULL characters in the input string.

A delta between these integers may be computed with integer subtraction and ZigZag encoded as this may produce a smaller difference than XOR for certain changes in ASCII. "7" to "8" need 2 bits to describe the difference using subtraction (1 bit for value, 2 with sign) whereas XOR may need 4 bits.

Strings with leading NULL characters (in addition to the null terminator) may be considered to be a very unusual case. These strings may be stored as an uncompressed literal to avoid sacrificing bits to store a size.

Skipped values may be stored in a Simple-8b block with regular encoding independent of the length of the previous string value.

Undefined (0x06), Null (0x0A)

Value 0 may encode existing element.

Boolean (0x08)

Stored similar to Int32, 0 may represent false and 1 may represents true.

Timestamp (0x11)

Stored similar to 64 bit integer but may delta-of-delta instead of delta.

ObjectId (0x07)

ObjectId may be a 12 byte value. In some embodiments, the 12-byte value may have the following meaning of the different bytes, as shown in Table 3 previously.

The encoder may rearrange the bytes to have the bytes most likely to change at the lower byte indexes. During encoding of the ObjectId, the process unique identifier should not have changed and may be discarded. Table 19 shows an example encoded ObjectId having the bytes rearranged such that the bytes most likely to change are placed at the lower byte index. Further, Table 4, as previously presented, shows that the example encoded ObjectId with a discarded process unique identifier. When reconstructing the encoded ObjectId, the process unique identifier is taken from the previous uncompressed element.

The remaining 7 bytes will be interpreted as a 64 bit integer and delta-of-delta stored like the Datetime BSON type. If the delta-of-delta is too large a full literal of the ObjectId may be written to the stream.

Regular Expression (0x0B), DBPointer (0x0C), Code with Scope (0x0F), Symbol (0x0E)

N/A. Values may be stored as literal (0b00)

Appending to Previously Written BSONColumn Buffer

A stateful encoder may record previous value and pointers/offsets to the last written stream byte (for count) and last written 64 bit data block. When finalizing the binary, a literal EOO may be written to the end of the buffer. To continue to append data, the last EOO may be erased, and the internal encoder state may be restored with the recorded previous value and pointers. This may allow incoming values or measurements to be added to the BSONColumn.

To append the BSONColumn with a sub-stream, the sub-stream end byte may also be erased. This may allow the sub-index position to be 0 and can simply start new binary blocks. In some embodiments, the reference object may be updated to align with the appended sub-stream.

Compressed Time-Series Bucket Design

Compressed bucket schema

{_id: ObjectId ( . . . ),
  control: {
    version: 2,
    count: 37,
    min: {_id: . . . , time: ISODate ("2020-09-09T16:54:04.174Z"), field0: 0.01, . . . },
    max: {_id: . . . , time: ISODate ("2020-09-09T16:54:04.450Z"), field0: 0.99, . . . },
  },
  meta: . . . ,
  data: {_id: <BSON Binary Subtype 7>,
    time: <BSON Binary Subtype 7>,
    field0: <BSON Binary Subtype 7>,
    field1: <BSON Binary Subtype 7>,
    . . . }
}

Compressed bucket schema may be similar to version 1. In some embodiments, compressed bucket schema may include at least one BSONColumn using BSON Binary subtype 7 for compact storage for timeseries columns. In some implementations, compressed bucket schema may be similar to version 1 but with the following changes:

Version may be incremented to 2.

Subfields under data may be compressed using binary subtype 7.

Measurements may be sorted by the time field.

Count field under 'control' may represent the number of measurements under data. In some embodiments, all measurements may have identical counts. In some embodiments, the number of values (including missing values) in each field (e.g., id, time, field0, etc., shown above) of the data may be equivalent to the number of measurements indicated by the count field.

In some embodiments, data in the control and meta fields may remain uncompressed.

BSONColumn

A BSONColumn class may be added to help interpret a BSON Binary Subtype 7 compressed buffer.

Constructed from BSONElement of binary subtype 7 or char* buffer and size. May take ownership of the underlying buffer.

May provide forward iteration of uncompressed BSONElement.

Iterator value type is optional<BSONElement> where none is skip.

Returned BSONElement may have an empty field name.

Manages memory needed for BSONElement constructed from compressed data.

Interface for empty( ) with O(1) time complexity.

May not have interfaces for functionality that require O(N) time complexity such random access or reverse iteration. In some embodiment, count( ) may be used in case that the count is missing in the bucket control block.

Because BSONColumn provides forward iteration, the memory for a particular index may be needed in a set order. The forward iterator may use an internal iterator over memory managed by the BSONColumn and re-use expanded BSONElement that was decompressed in a previous iteration pass. When this internal iterator points to the end of managed memory, the next element in the buffer may need to be decompressed.

BSONColumnBuilder

In some embodiments, a helper class may be provided to build a BSON binary subtype 7 buffer. The helper class may provide two functions as its core interface:

append (int index, BSONElement)

Ignores the field name and delta compresses values. The index needs to be larger than last call to append.

skip (int N)

Skips N indexes

Values may be appended to a BufBuilder to where either a literal BSONElement or delta compressed 64 bit word may be written. Appending may re-write the last written 64 bit word until it is full and the builder may then start a new one.

Determining Selector

To determine the optimal selector, a sequence of multiple values may be used. The encoder wants to use as small a selector as possible while still ensuring that there are enough bits to encode all incoming values. The maximum value that fits in a block can easily be calculated as $2^{N-1}$, where N is the number of bits in the block.

When appending values, the encoder may write Simple-8b blocks using a greedy algorithm where the largest amount of values are packed into a single Simple-8b block. This is determined when a value is appended that will not fit in the current Simple-8b block that it is building. A block is then finalized containing the highest number of values and the encoder continues onto the next Simple-8b block. Note that several Simple-8b may be finalized at a single append. For example, if there are 29 values that would fit in Selector 2 (with 30 slots) but the 30th value that is appended requires 60 bits, the encoder may write out Selectors 3, 7 & 14 (with 20+8+1=29 slots).

When 64 bit Simple-8b blocks are added or removed, the count in the current stream operation byte may be updated. When this count is exhausted, a new stream operation byte may be added.

Counting the number of trailing zeros in values may be done to decide whether the extended selectors with a bit shift should be used over the regular selectors. This operation can be done efficiently using the Bit Scan Forward (BSF) instruction (or TZCNT on newer Intel architectures).

Determining Scale Factor for Doubles

Using as low scale factor as possible is beneficial as long as it allows lossless representation of the input value as an unsigned integer. The encoder may convert value to integer using scale factor 0 And increase it in a loop until successful conversion is accomplished. If a new value is appended that needs a higher scale factor, the encoder may compare if scaling previously added values higher or starting a new Simple-8b block yields the best compression.

The procedure may restart when a new Simple-8b block is started. Changing scale factor may require a new operation byte to be written. But the overhead of this byte is likely less than using an oversized scale factor as it adds multiple bits per value.

If the same scale factor is used as the previous Simple-8b block the operation byte may skipped and the block count is incremented in the last operation byte instead.

Determining Reference-Object for Sub-Object Compression

Multiple inputs may be needed to determine reference-object. The reference-object may start off being identical to the first input and compatible changes observed in subsequent input measurements may merged in to build an updated reference-object. During this phase, inputs may be cached and may be compressed when the reference-object is finalized and no further changes may be merged in.

When the builder is in the reference-object building phase, the input measurements may be traversed in lock-step with the current reference-object where the outcome can be one of three:

1. Input is compatible with current reference-object.
   a. Input is appended to the cache.
2. Input is compatible with current reference-object but requires a change to be merged in because a new scalar subfield was detected.
   a. Merge and append of the input to the cache may be performed. All previously cached inputs are by definition may be compatible with the new reference subobject as only new scalar fields may be added. No change that can be incompatible with previously added inputs are allowed.
3. Input is incompatible with current reference-object.
   a. End sub-object compression and re-start with input as new initial reference object.

The process above may end when the number of cached inputs are twice as many as scalar fields in the current reference object. At this point mergeable.

Bucket Compression

In some implementations, buckets may be compressed as a second step after the BucketCatalog notifies the writer that the bucket has been closed. This can happen either after a WriteBatch has been committed or a rollover occurred when a measurement was inserted. The BucketCatalog may return the ObjectId for the closed bucket.

The writer will at that point read the full uncompressed bucket (v1 format) from the storage engine and sort all measurements on the time field.

The measurements may then be iterated over in sorted order to be compressed. One BSONColumnBuilder may be used per field in the measurements. If a new field is discovered in a later measurement, a new BSONColumnBuilder may be instantiated with the necessary index skip.

Bucket Unpacking

The BucketUnpacker class may inspect the value of the version field to determine the iterator type to use. It may be updated to do iteration using a virtual interface where the regular BSONObjIterator and the new BSONColumn::iterator may be abstracted away.

Incremental Compression

Instead of appending to the bucket uncompressed and compressing as a second step when the bucket is closed an implementation may compress incrementally. As it is not feasible to maintain the guarantee that the compressed data is sorted on time without having the encoder state in memory, an implementation may maintain an encoder state in memory for buckets for which the compressed data has already been written to storage. Some implementations may instead, or additionally, choose to reestablish the encoder state for a bucket by reopening: retrieving the compressed bucket data retrieved from storage and partially or entirely decoding it.

Secondary Indexes on Timeseries Measurements

Figure 12:
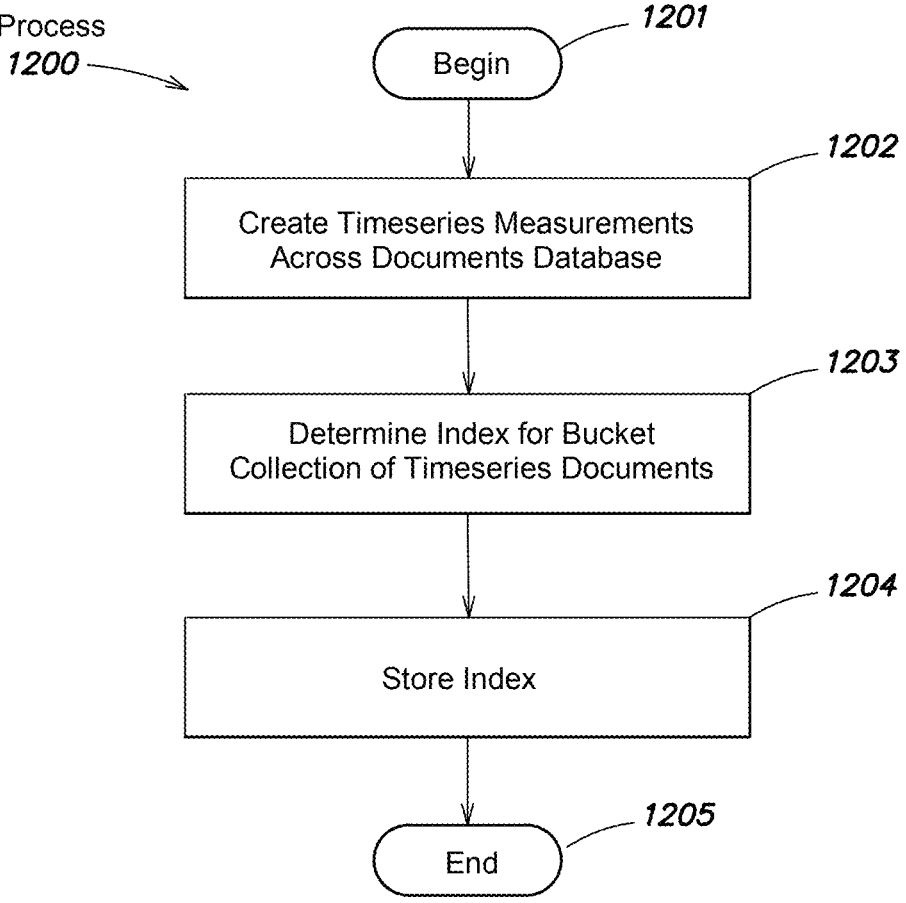
FIG. 12 shows an example process for determining an index for timeseries documents according to various embodiments.

As discussed, some embodiments described herein relate to determining secondary indexes for timeseries data. Such indices may be used to improve performance of querying and other processing operations among a number of time-series buckets and documents. FIG. 12 shows an example process 1200 for determining an index for timeseries documents according to various embodiments. At block 1201, process 1200 begins. At block 1202, the system creates timeseries measurements that are stored across documents within a document-type database (e.g., a MongoDB database). At block 1203, the system may determine one or more indices associated for a particular bucket collection of timeseries documents. At block 1204, the system stores the index (e.g., as part of the collection or other location). At block 1205, process 1200 ends.

In some embodiments, it is appreciated that different types of indexes may be generated on timeseries measurements (e.g., indexes for documents) that enable various query functions and provide more efficient searching. For example, in some embodiments, sorting based on ascending and/or descending indexes may be provided for various timeseries collection measurement fields of a buckets collection. In some embodiments, geo-type indexes may be provided that permit geo-type searching of documents within a buckets collection. In some embodiments, geo-type indexes (e.g., geographically-based indexes) may be 2d index types, 2dsphere index types, etc. Further, in some embodiments, the system may provide support for compound indexes of different types.

Example Implementations

In some embodiments, additional functions may be provided to create additional index types and store them for use with processing database documents. Fr example:

The createIndexes command may support building additional index types on time-series collections.

On the metadata field, partial, 2d and 2dsphere index types may be supported.

On the measurement field, ascending, descending, 2dsphere and partial index types may be supported.

Compound index key patterns that may be supported on regular collections and on time-series collections.

Detailed Examples

Ascending and Descending Indexes

For ascending indexes, a createIndexes command on a time-series collection measurement field:

```
{
    createIndexes: "abc",
    indexes: [{key: {a: 1}}]
}
``` may be equivalent to the following operation on the underlying buckets collection:

```
{
    createIndexes: "system.buckets.abc",
    indexes: [{key: {control.min.a: 1, control.max.a: 1}}]
}
```

For descending indexes, a createIndexes command on a time-series collection measurement field:

```
{
    createIndexes: "abc",
    indexes: [{key: {a: −1}}]
}
``` may be equivalent to the following operation on the underlying buckets collection:

```
{
    createIndexes: "system.buckets.abc",
    indexes: [{key: {control.max.a: −1, control.min.a: −1}}]
}
```

The original user index definition will be stored in an extra, optional field on the transformed index definition in the buckets' collection.

Consider three buckets for a measurement value M, with [min, max] ranges: [0, 9], [10, 19] and [20, 25].

1. The {$gt: 11} query must search for all buckets where the max for M is greater than 11.
2. The {$lt: 11} query must search for all buckets where the min for M is less than 11.

For the two queries above, the {control.min.a: 1} and {control.max.a: 1} indexes are sufficient. Queries with multiple operators are executed may be executed. For example, the {$gt: 11, $lt: 20} query would first search for all buckets where the max for M is greater than 11. Then, of the buckets where the max for M is greater than 11, a search for buckets where the min for M is less than 20 is performed.

Array Values

In some embodiments, compound indexes may allow at most one component to be multikey. This may allow for at most one component whose value includes an array. In some embodiments, a restriction may be implemented to prevent a huge, cross-product, number of index entries per document. When the system attempts to insert {x: [1, 2]}, the system may attempt to index {control: {min: {x: [1, 2]}, max: {x: [1, 2]}}}, which may automatically fail.

Special handling for this may not be necessary because of typed-based bucket splitting. On a clean collection, any array in an event may show up in the min/max.

Compound Indexes

Compound indexes may build off the ascending and descending indexes. Compound indexing may be an index structure that holds reference to multiple fields. Compound indexing may support queries that match on multiple fields. For instance, a compound index may be created as shown below. A createIndexes command on a time-series collection measurement field:

```
{
    createIndexes: "abc",
    indexes: [{key: {a: 1, b: 1}}]
}
``` may be equivalent to the following operation on the underlying buckets collection:

```
{
    createIndexes: "system.buckets.abc",
    indexes: [
        {key: {control.min.a: 1, control.max.a: 1,
            control.min.b: 1, control.max.b: 1}
        }]
}
```

As shown in the above example, a compound index may be created that holds reference to both field "a" and field "b". In some embodiments, the compound index created above may support sorting by ascending "a" value and then by ascending "b" values. In some embodiments, the compound index created above may support queries on field "a" and queries on both field "a" and field "b".

Additionally, a createIndexes command on a time-series collection measurement field with both ascending and descending options:

```
{
    createIndexes: "abc",
    indexes: [{key: {a: 1, b: −1}}]
}
``` will be equivalent to the following operation on the underlying buckets collection:

```
{
    createIndexes: "system.buckets.abc",
    indexes: [
        {key: {control.min.a: 1, control.max.a: 1,
            control.max.b: −1, control.min.b: −1
        }}]
}
```

As shown in the above example, a compound index may be created that holds reference to both field "a" and field "b". In some embodiments, the compound index created above may support sorting by ascending "a" value and then by descending "b" values. In some embodiments, the compound index created above may support queries on field "a" and queries on both field "a" and field "b".

Geo-Type Indexes on Metadata

Because metadata may not vary within a bucket, geo indexes on metadata can use an ordinary geo index on the time-series buckets collection.

For example,

```
{
    createIndexes: "abc",
    indexes: [{key: {"metaFieldName.a": "2dsphere"}}]
}
``` will become

```
{
    createIndexes: "system.buckets.abc",
    indexes: [{key: {"meta.a": "2dsphere"}}]
}.
```

Similarly, during pipeline optimization, geo-type index predicates on metadata may be swapped with the $_internalUnpackBucket stage to expose these predicates to the query planner:

```
{$unpack . . . }
{$match: {metaFieldName.a: {$geoWithin . . . }}
``` may become

```
{$match: {meta.a: {$geoWithin . . . }}
{$unpack . . . }
```

Geo-Type Indexes on Measurements

In the case of other index types, the index definition may be re-mapped onto combinations of existing control fields in the bucket collection. For geo-types, the summary stored in the control fields may not be detailed enough to index it directly. Instead, the index definition may be transformed to use a new internal index type that is aware of the bucket structure. In particular, a measurement field may be present in the bucket document as data.a, but may hold the column-pivoted data for all measurements. Thus, a definition

```
{
    createIndexes: "abc",
    indexes: [{key: {"a": "2dsphere"}}]
}
``` will become

```
{
    createIndexes: "system.buckets.abc",
    indexes: [{key: {"data.a": "2dsphere_bucket"}}]
}.
```

The new index type may treat the field a as a column of points and generate a region containing the points. From here out, the solution may be similar to existing geo-type indexes: create a covering for the region (using the appropriate space-filling curve library) and generate index keys from the covering.

The new index type may be considered internal. Attempting to create the new index type directly on a non-bucket collection may result in an error. When examining the indexes on a time-series collection, it may report the original index type rather than the new transformed type. Examining the bucket collection directly may return the new type.

$_internalBucketedGeoWithin

The query planner (QueryPlanner::plan) may not know anything about time-series: all the query planner sees is a query on the buckets collection. For a predicate to use an index, that predicate may be before $_internalUnpack-Bucket in the pipeline (after optimization).

It is appreciated that a new, internal query operator to expose the bucket-level predicate to the query planner may be used.

Semantically, the operator may select every bucket that might contain events within the given geo region.

It may return extra buckets but must not miss any.

Physically, it may execute in a couple of different ways:

1. When a geo index is available, the index may scan entries to approximately decide which buckets are relevant. The bucket documents may not need to be inspected.

2. Otherwise, some buckets which are guaranteed not to have a matching event may be filtered out using control.min/control.max.

It may be a pathless MatchExpression, to allow it to read from any field in the document.

It may take keyword arguments in case.

For example,

```
db.events.aggregate([
    {$match: {abc: {$geoWithin: {$geometry: . . . }}}},
])
``` would be optimized to:

```
db.system.buckets.events.aggregate([
    {$match: {$_internalBucketedGeoWithin: {
        region: {$geometry: . . . },
        field: "abc",
    }}},
    {$_internalUnpackBucket: . . . }
    {$match: {abc: {$geowithin: {$geometry: . . . }}}},
])
```

Geo Sorting—$near, $nearSphere, $geoNear

The following three operators may sort by distance from a query point:

```
.find ({loc: {$near: . . . }})
.find ({loc: {$nearSphere: . . . }})
.aggregate ([{$geoNear: . . . }])
```

$geoNear

The $geoNear stage may perform several functions:

filters documents based on distance from a query point sorts documents based on that distance adds a field with that distance limit the number of results On a normal collection, $geoNear may be the first stage, because it has an execution plan that requires an index.

For time-series metadata, the $geoNear and $unpack-Bucket stages may be swapped. After optimization, the $geoNear may be the first stage in the pipeline and may execute with its plan as usual.

For time-series measurements, the $geoNear stage may be rewritten as an explicit $match, $sort, and projection. After optimization, the $match may use an index if one is available. If the user specified a limit, then the $sort may be a top-k sort.

Partial Indexes

Selective Indexing Per-Bucket

When creating an index on a time-series view, the partial filter expression may be implemented to generate partial indexes. The partial filter expression may be "pushed down" similar to how query predicates are pushed down:

Predicates on metadata may be unchanged, except for renaming the field.

Predicates on measurements may become coarser: they use control.min/control.max.

In some embodiments, the partial indexes may only index time-series metadata that meet a specified filter expression. In some embodiments, partial indexes may have lower storage requirements and reduced performance costs for index creation and maintenance. For example, partial indexes may be created using createIndexes command on the view:

```
{
    createIndexes: "events",
    indexes: [
        {
            key: { a : 1 },
            partialFilterExpression: { $and: [
                { 'meta.sensor_type': 'temperature' }
                { value: { $eq: 70 } },
            ] }
        }
    ]
}
``` may be equivalent to this command on the underlying buckets collection:

```
{
    createIndexes: "system.buckets.events",
    indexes : [
        {
            key: { control.min.a : 1, control.max.a : 1 },
            partialFilterExpression: { $and: [
                { 'meta.sensor_type': 'temperature' },
                { control.max.value: { $gte: 70 } },
                { control.min.value: { $lte: 70 } },
            ] }
        }
        {
            key: { control.max.a : 1, control.min.a : 1 },
            partialFilterExpression: { $and: [
                { 'meta.sensor_type': 'temperature' },
                { control.max.value: { $gte: 70 } },
                { control.min.value: { $lte: 70 } },
            ] }
        }
    ]
}
```

In some embodiments, partial filter expression may support filter conditions using $eq, $exists, $lt/$gt/$lte/$gte, $type, $and, $or, or $in.

Appearance in listIndexes listIndexes( ) on the view may show the original partial-filterExpression as the user entered it. The original expression on the index specification may be stored under the originalSpec field in the catalog.

Example index entry in the catalog:

```
{
    backgroundSecondary: False,
    head: 0L,
    multikey: False,
    multikeyPaths:          {control.max.x:          Binary
        ('\x00\x00\x00', 0),
        control.min.x: Binary ('\x00\x00\x00', 0)},
```

```
    ready: True,
    spec: {key: {control.max.x: 1.0,
        control.min.x: 1.0},
        name: 'x',
        originalSpec: {key: {x: 1.0},
            name: 'x',
            partialFilterExpression: {x: 1.0},
            v: 2},
        partialFilterExpression: <translated PFE>,
        v: 2}
    }
```

Creating an index directly on the buckets collection may be permitted. This approach may not have an originalSpec field in the catalog.

Selective Indexing by Location

Support for $geoWithin may also be supported in the partial filter expression. A query may use this index if the query's $geo Within region is contained in the index's On a time-series collection, the same predicate pushdown may be relied upon for geo queries. Roughly,

```
    {$unpackBucket . . . }
    {$match: {loc: {$geoWithin . . . }}}
``` will be translated to:

```
    {$match: {data.loc: {$bucketGeoWithin . . . }}
    {$unpackBucket . . . }
    {$match: {loc: {$geoWithin . . . }}
```

Interaction with Mixed-Types Bug

When the bucket-level partialFilterExpression is generated, a simpler rule may be used that assumes the collection is marked clean—even if the collection may be marked dirty when the createIndex command is received. By the time the index build succeeds, it is confirmed that the collection is clean.

When the user tries to create a partial index on a possibly dirty collection, the system may check every bucket.

For example, consider an index on x.y. If one measurement has {x: 5}, one has {x: <date>}, and one has {x: {y: true}}, then the min will be 5, the max will be <date>, and the bucket will not be indexed since control.min.x.y and control.max.x.y are missing. If this bucket exists, the index build may fail.

Once the index build succeeds, the collection may be marked clean (even though it's partial) because we've checked every bucket.

Hint

Users may hint indexes by name, but not by index key.hint( ) on the view accepts any index name that listIndexes( ) on the view returns.

Mixed Types Bug

There are several interesting cases in which mixed types may be addressed.

In particular, there may be situations where mixed types may result in container types being overshadowed and hidden by scalar types or other container types.

For example: if the control.min is 3 and the control.max is [4,5] this can obscure the lower array bounds causing us to miss matches for queries like {$lt: 2}.

Similarly queries on nested fields can be missed if the object bounds are overwritten by a scalar type.

For example: if the control.min on a prefix path is 3 and the control.max is {b: 3} then the values for the query {a.b: {$lt: 2}} may be missed. A similar thing holds if the control.min is [{b: 3}, 3] and the control.max is Date ("2020 Feb. 2").

An example of mixed container types extends the previous example but assume that the query is {a.b: {$gt: 9}} and the control.min is {b: [3,4]} and the control.max is [{b: 8}].

These buckets may be filtered to prevent container types being overshadowed and hidden.

Implementation Alternative—Different Types, Different Buckets

On insert, put different types in different buckets.

Insert Path

When attempting to insert a new event into an open bucket, the following 3 values are recursively compared:
    the event's measurement fields
    control.min
    control.max
in order to compute the new 'control.min' and 'control.max' values.

On each recursive call, the following cases may be present:
    If the measurement value is missing, then control.min and control.max are unchanged.
    If control.min and control.max are missing, then the measurement value becomes the new control.min and control.max.
    If the canonical type of the measurement is different than the min or max, the measurement may not be inserted into the event into this bucket. The bucket may be closed and a new buck may be opened.
    If all 3 values are non-missing, and have the same canonical type.
        If the type is 'array', recur on each corresponding index.
        If the type is 'object', recur on each corresponding field name.
        Otherwise, if the type is a scalar: update the min and max.

Invariants

The above rule for inserts may ensure that mixed-type buckets are not created. For any path 'a.b.c', For any path 'a.b.c',
    'control.min.a.b.c' is missing if-and-only-if 'a.b.c' is missing on every event in the bucket.
    The same thing may be for max.
    Conversely, 'control.min.a.b.c' is present if 'a.b.c' is present on one or more events in the bucket.
    All the events, and the summary, may all have the same canonical type for 'a.b.c'. (Excluding events where 'a.b.c' is missing.)
    If 'control.min.a.b.c' is a scalar, then control.min.a.b.c 'is the min of all the non-missing 'a.b.c' values from the events.
    The same thing may be for max.

Examples

Sparse Data

Missing fields may not cause any conflict, so all of the following may fit in the same bucket:

```
    {cpu: {idle: 0.0}}
    {cpu: {system: 0.2}}
    {cpu: {user: 99.8}}
    {cpu: {idle: 0.0}}
    {mem: {virtual: 1002}}
    {mem: {physical: 3.1}}
```

Because
    'cpu' may be an object, or missing
    'cpu.idle' may be a number, or missing
    etc Numeric Types Different numeric types may be compatible, so the following may fit in the same bucket:

```
    {cpu: 0.125}
    {cpu: NumberDecimal('0.01')}
    {cpu: NumberLong(2)}
    {cpu: NumberInt(3)}
```

Conflicting Types

These events may not fit into the same bucket:

{a: {x: 1}}

{a: {x: 'abc'}}

Arrays, scalars, and objects may be considered separate types, so each type may be placed in a separate bucket:

{a: {b: 1}}

{a: {b: [1]}}

{a: [{b: 1}]}

{a: [{b: [1]}]}

Null may be a separate type, so these the following may be placed in separate buckets:

{cpu: {idle: 1, system: null}}

{cpu: {idle: null, system: 2}

For sparse data the field may be omitted.

This sequence of inserts may create 3 buckets, not 2:

{a: 1}

{a: 'asdf'}

{a: 2}

Because each time the type changes, the bucket may be closed and a new bucket may be opened.

Query Behavior

When a collection is marked "clean", a simpler predicate may be pushed down.

Queries may use indexes when the collection is marked "clean". There are two reasons:

The more complex predicate needed for dirty collections may not be indexable, because it checks so many different fields.

Partial indexes may have incorrect contents for dirty collections.

In some implementations, a database engine may support one or more of the following features (alone or in combination with these and other features):

Support creating indexes on a time-series collection.

Indexes should cover the following general categories:

Geo-type indexes on a single metadata field

Partial indexes on a single metadata field

Ascending and descending indexes on a single measurement field

Sparse indexes on a single measurement field

Partial indexes on a single measurement field

Index on a single, array-valued measurement field

Index on a single geo-type measurement field

Compound index involving ascending and descending measurement fields

Compound index involving geo-type measurement field

Compound index involving one array-valued measurement field

Compound index mixing measurement and metadata fields

Compound index mixing measurement and time fields

Support querying with index support on a time-series collection.

Extend the time-series fuzzer: queries should produce the same result with/without an index.

Compare $geoNear on a time-series collection vs normal collection.

Compare $geoNear on a time-series collection, with 2dsphere index, vs normal collection.

Partial indexes on a normal collection, using a $geoWithin predicate are chosen by the planner.

produce the expected result.

$geoWithin on time-series measurements uses a 2dsphere index when available.

produces the expected result.

$geoIntersects on time-series measurements uses a 2dsphere index when available.

produces the expected result.

Queries on time-series collection can specify a non-default collation.

It produces the expected result.

Queries on metadata use any index available on that field.

Non-string queries on measurements use any index available on that field.

String queries on measurements can use an index if the query and index collation are both 'simple'.

Compound indexes are used, and queries using them produce the expected results.

Types of indexes:

Ascending/descending

Geo

Mixture of measurement, time, metadata

Multikey (metadata only)

Types of queries:

Using the first field

Using some other field

Using more than one field

Queries are correct even for messy data (if insert( ) succeeds).

Geo queries where some events have missing or malformed geo data.

Simple $eq, $lt queries on mixed types (number, string, array, object, date, null, missing).

Design Alternatives

Geo Indexes

Different approaches may be used for geo-type indexes on measurement data:

1. Index the rectangle defined by the existing summary (control.min/control. max).

2. Index a new summary field containing a tight bounding region. This may require rewriting existing buckets at index creation time.

3. Index a new virtual summary field containing a tight bounding region. This circumvents the data rewrite issue, and avoids downgrade issues. In some embodiments, it may require a new operator to populate the virtual field on the query side.

Examples

Processing Queries

Figure 13:
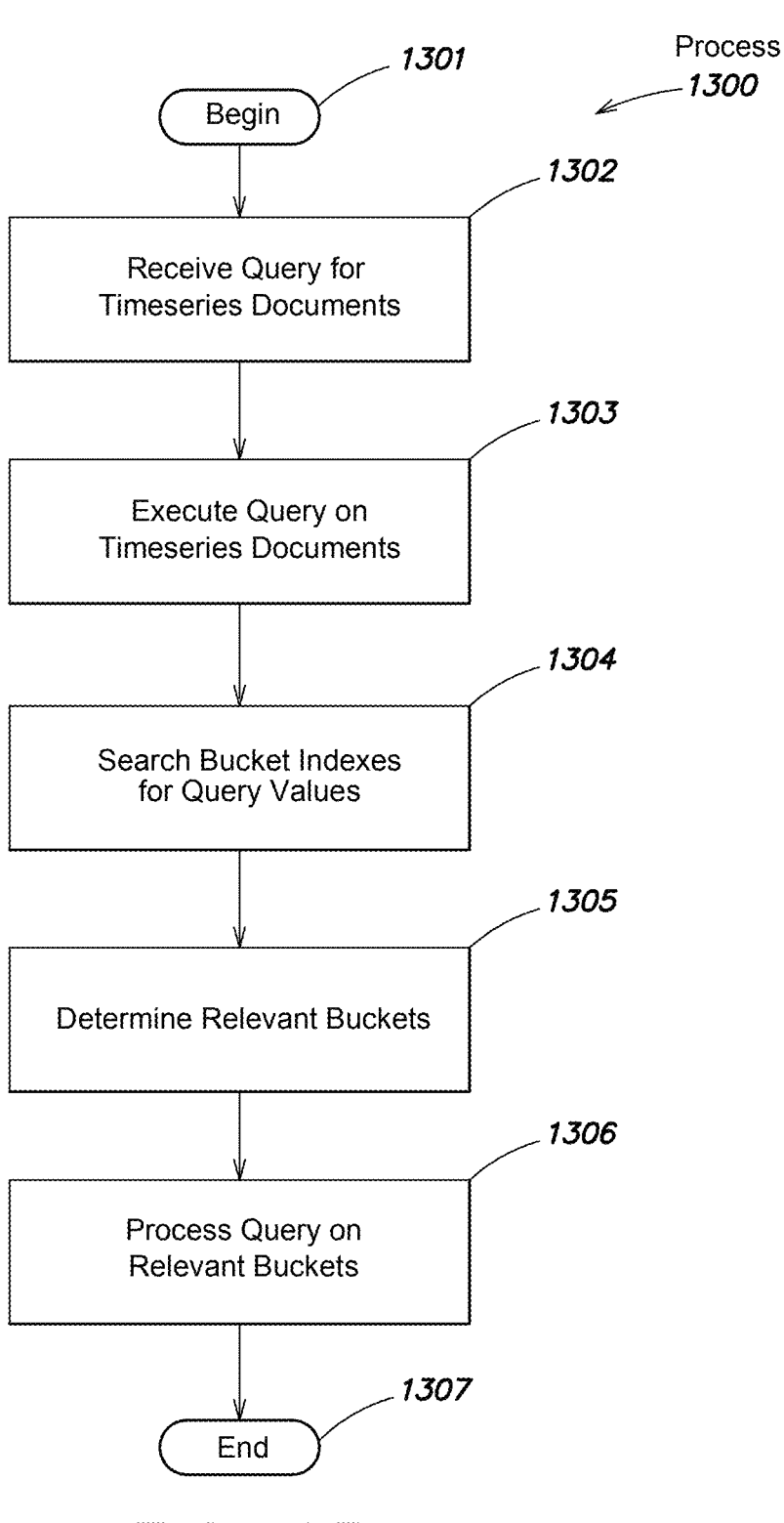
FIG. 13 shows an example process for processing a query on timeseries buckets according to various embodiments.

In some embodiments, created indices may be used in query support of document buckets within the database. Such indices may be used to speed up query operations (e.g., by eliminating further processing of bucket documents). FIG. 13 shows an example process 1300 for processing a query on timeseries buckets according to various embodiments. At block 1301, process 1300 begins. At block 1302, the system receives a query on a timeseries document collection.

At block 1303, the system executes the query on the timeseries documents which are stored among a number of data buckets. Previous to the query operation, one or more indices may have been determined for particular documents stored within each bucket. At block 1304, the system searches bucket indexes for particular values defined by the query. At block 1305, the system determines relevant buckets that may be used to eliminate processing of documents that do not satisfy the query. At block 1306, the system further processes the query on the relevant buckets. At block 1307, process 1300 ends.

Example Special-Purpose Computer System

A special-purpose computer system can be specially configured as disclosed herein. According to one embodiment the special-purpose computer system is configured to perform any of the described operations and/or algorithms (e.g., database operations). The operations and/or algorithms described herein can also be encoded as software executing on hardware that defines a processing component, that can define portions of a special purpose computer, reside on an individual special-purpose computer, and/or reside on multiple special-purpose computers.

Figure 14:
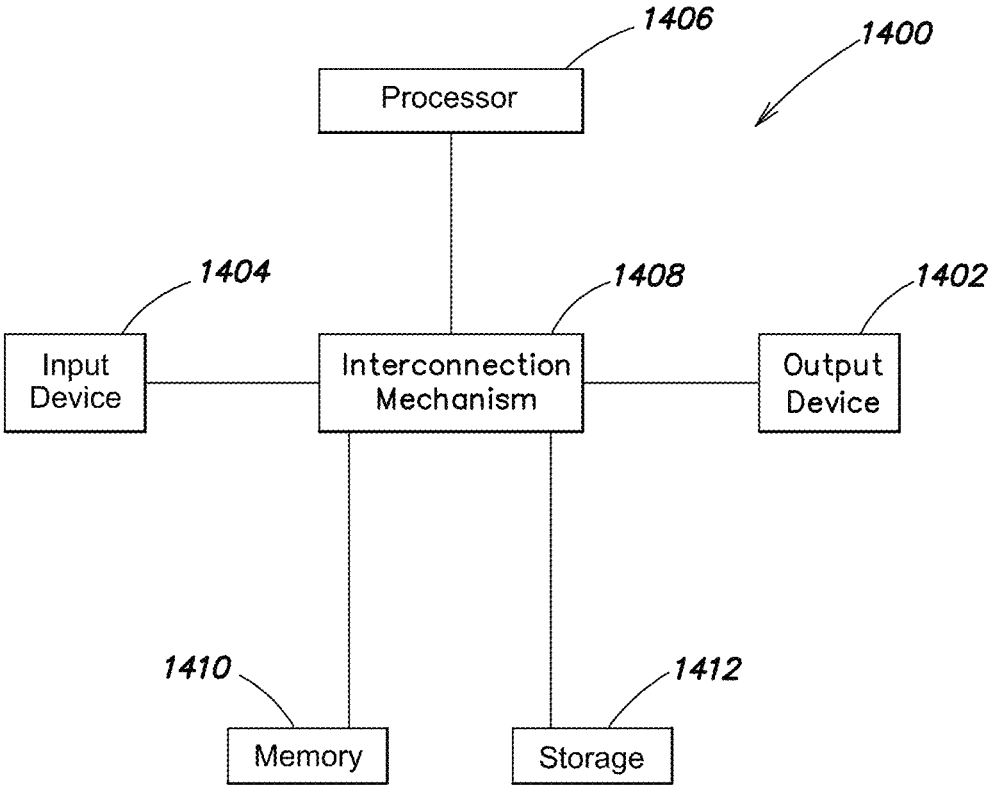
FIG. 14 is a block diagram of an example special-purpose computer system according to various embodiments.

FIG. 14 shows a block diagram of an example special-purpose computer system 1400 on which various aspects of the present invention can be practiced. For example, computer system 1400 may include a processor 1406 connected to one or more memory devices 1410, such as a disk drive, memory, or other device for storing data. Memory 1410 is typically used for storing programs and data during operation of the computer system 1400. Components of computer system 1400 can be coupled by an interconnection mechanism 1408, which may include one or more busses (e.g., between components that are integrated within a same machine) and/or a network (e.g., between components that reside on separate discrete machines). The interconnection mechanism enables communications (e.g., data, instructions) to be exchanged between system components of system 1400.

Computer system 1400 may also include one or more input/output (I/O) devices 1402-1404, for example, a keyboard, mouse, trackball, microphone, touch screen, a printing device, display screen, speaker, etc. Storage 1412 typically includes a computer readable and writeable nonvolatile recording medium in which computer executable instructions are stored that define a program to be executed by the processor or information stored on or in the medium to be processed by the program.

Figure 15:
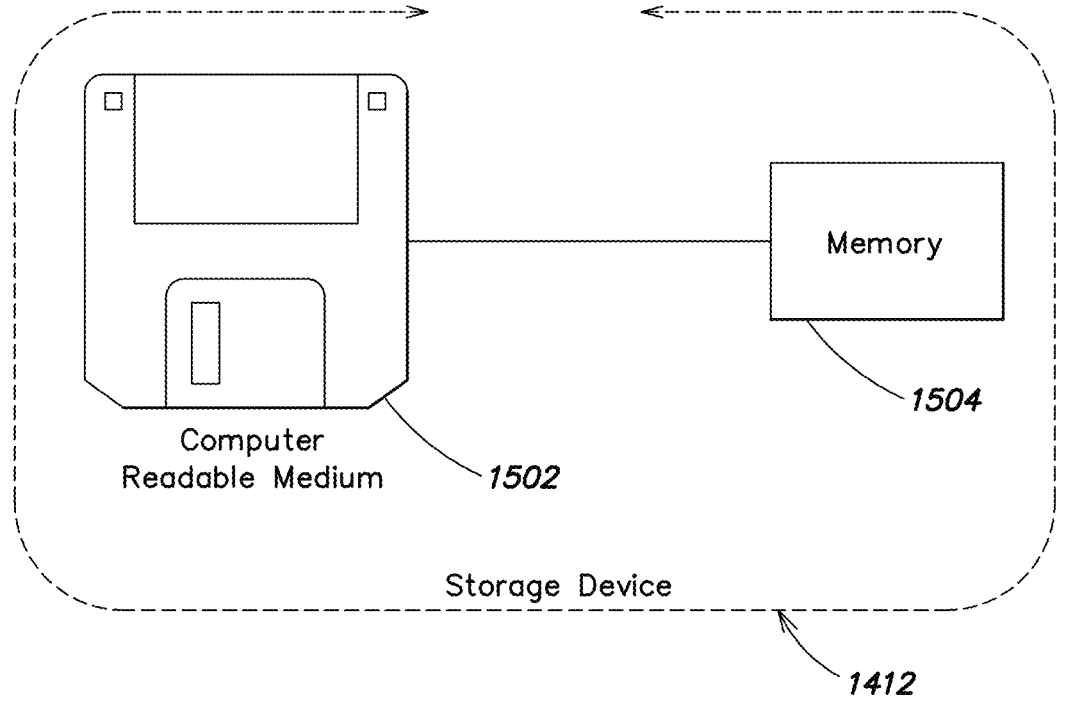
FIG. 15 is a block diagram of an example disk or flash memory according to various embodiments.

The medium can, for example, be a disk 902 or flash memory as shown in FIG. 15. Typically, in operation, the processor causes data to be read from the nonvolatile recording medium into another memory 1504 that allows for faster access to the information by the processor than does the medium. This memory is typically a volatile, random access memory such as a dynamic random-access memory (DRAM) or static memory (SRAM). According to one embodiment, the computer-readable medium comprises a non-transient storage medium on which computer executable instructions are retained.

Referring again to FIG. 15, the memory can be located in storage 1412 as shown, or in memory system 1110. The processor 1106 generally manipulates the data within the memory 1410, and then copies the data to the medium associated with storage 1412 after processing is completed. A variety of mechanisms are known for managing data movement between the medium and integrated circuit memory element and the invention is not limited thereto. The invention is not limited to a particular memory system or storage system.

The computer system may include specially-programmed, special-purpose hardware, for example, an application-specific integrated circuit (ASIC). Aspects of the invention can be implemented in software, hardware or firmware, or any combination thereof. Although computer system 1400 is shown by way of example, as one type of computer system upon which various aspects of the invention can be practiced, it should be appreciated that aspects of the invention are not limited to being implemented on the computer system as shown in FIG. 14. Various aspects of the invention can be practiced on one or more computers having a different architectures or components than that shown in FIG. 14.

It should be appreciated that the invention is not limited to executing on any particular system or group of systems. Also, it should be appreciated that the invention is not limited to any particular distributed architecture, network, or communication protocol.

Various embodiments of the invention can be programmed using an object-oriented programming language, such as Java, C++, Ada, or C# (C-Sharp). Other programming languages may also be used. Alternatively, functional, scripting, and/or logical programming languages can be used. Various aspects of the invention can be implemented in a non-programmed environment (e.g., documents created in HTML, XML or other format that, when viewed in a window of a browser program, render aspects of a graphical-user interface (GUI) or perform other functions). The system libraries of the programming languages are incorporated herein by reference. Various aspects of the invention can be implemented as programmed or non-programmed elements, or any combination thereof.

A distributed system according to various aspects may include one or more specially configured special-purpose computer systems distributed among a network such as, for example, the Internet. Such systems may cooperate to perform functions related to hosting a partitioned database, managing database metadata, monitoring distribution of database partitions, monitoring size of partitions, splitting partitions as necessary, migrating partitions as necessary, identifying sequentially keyed collections, optimizing migration, splitting, and rebalancing for collections with sequential keying architectures.

CONCLUSION

Having thus described several aspects and embodiments of this invention, it is to be appreciated that various alterations, modifications and improvements will readily occur to those skilled in the art. Such alterations, modifications, and improvements are intended to be part of this disclosure and are intended to be within the spirit and scope of the invention. Accordingly, the foregoing description is by way of example only.

Use of ordinal terms such as "first," "second," "third," "a," "b," "c," etc., in the claims to modify or otherwise identify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A system comprising:
   a database engine configured to store, in a database, a plurality of timeseries events as a plurality of documents within a bucket, the database engine being further configured to:
      store, in a columnar format, the plurality of timeseries events represented by the plurality of respective documents;
      determine an index associated with the plurality of respective documents within the bucket;

determine a geographically-based index relating to the stored plurality of timeseries events represented by the plurality of documents, wherein the database engine is configured to determine the geographically-based index by:

determining a first geographically-based index comprising information associated with at least a subset of the plurality of timeseries events; and transforming the first geographically-based index to a second geographically-based index when the information of the first geographically-based index associated with at least the subset is not sufficient to directly index at least the subset of the plurality of timeseries events, by transforming a definition of the first geographically-based index to define the second geographically-based index to indicate a measurement field of the timeseries events to be indexed as a column of points;

generate the determined geographically-based index to index at least the subset of the plurality of timeseries events; and store the generated geographically-based index in the database.

2. The system according to claim 1, wherein the geographically-based index comprises an index determined based on metadata associated with the bucket.

3. The system according to claim 1, wherein the geographically-based index comprises an index determined based on timeseries event data.

4. The system according to claim 1, wherein the database engine is further configured to sort timeseries events by a distance from a query point.

5. The system according to claim 1, wherein the database engine is further configured to filter documents based on a distance from a query point.

6. The system according to claim 1, wherein the database engine is further configured to add field data specifying a distance from a query point.

7. The system according to claim 1, wherein the database engine is further configured to selectively index documents that fall within a specified boundary.

8. The system according to claim 1, wherein the database engine is further configured to process a query using the determined index.

9. The system according to claim 1, wherein the index is associated with the plurality of timeseries events based on time values.

10. The system according to claim 1, wherein the database engine being further configured to determine a secondary index, wherein the secondary index is an ascending or descending index based on data values associated with a measurement field represented by the plurality of documents.

11. The system according to claim 1, wherein the database engine being further configured to determine a secondary index, wherein the secondary index is a compound index based on data values associated with a plurality of measurement fields represented by the plurality of documents.

12. The system according to claim 1, wherein the database engine being further configured to determine an index relating to a portion of the stored plurality of timeseries events that meet a specified filter expression.

13. The system according to claim 1, wherein the database engine being further configured to determine an index relating to a portion of the stored plurality of timeseries events that meet a specified filter expression.

14. A system comprising:

storing, by a database engine in a database, a plurality of timeseries events as a plurality of documents within a bucket, the database engine being further configured to:

store, in a columnar format, the plurality of timeseries events represented by the plurality of respective documents;

determine an index associated with the plurality of respective documents within the bucket;

determine a geographically-based index relating to the stored plurality of timeseries events represented by the plurality of documents, wherein the database engine is configured to determine the geographically-based index by:

determining a first geographically-based index comprising information associated with at least a subset of the plurality of timeseries events; and transforming the first geographically-based index to a second geographically-based index when the information of the first geographically-based index associated with at least the subset is not sufficient to directly index at least the subset of the plurality of timeseries events, by transforming a definition of the first geographically-based index to define the second geographically-based index to indicate a measurement field of the timeseries events to be indexed as a column of points;

generate the determined geographically-based index to index at least the subset of the plurality of timeseries events; and store the generated geographically-based index in the database.

15. The method according to claim 14, wherein the database engine is being further configured to determine a secondary index, wherein the secondary index is at least one of:

an ascending or descending index based on data values associated with a measurement field represented by the plurality of documents, a compound index based on data values associated with a plurality of measurement fields represented by the plurality of documents, or an index relating to a portion of the stored plurality of timeseries events that meet a specified filter expression.

16. The method according to claim 15, wherein the index is associated with the plurality of timeseries events based on time values.

17. A non-transitory computer-readable medium containing instructions that, when executed, cause at least one computer hardware processor to perform:

storing, by a database engine in a database, a plurality of timeseries events as a plurality of documents within a bucket, the database engine being further configured to:

store, in a columnar format, the plurality of timeseries events represented by the plurality of respective documents; and determine an index associated with the plurality of respective documents within the bucket;

determine a geographically-based index relating to the stored plurality of timeseries events represented by the plurality of documents, wherein the database engine is configured to determine the geographically-based index by:

determining a first geographically-based index comprising information associated with at least a subset of the plurality of timeseries events; and transforming the first geographically-based index to a second geographically-based index when the information of the first geographically-based index associated with at least the subset is not sufficient to directly index at least the subset of the plurality of timeseries events, by transforming a definition of the first geographically-based index to define the second geographically-based index to indicate a measurement field of the timeseries events to be indexed as a column of points;

generate the determined geographically-based index to index at least the subset of the plurality of timeseries events; and store the generated geographically-based index in the database.

18. The non-transitory computer-readable medium according to claim 17, wherein the database engine is being further configured to determine a secondary index, wherein the secondary index is at least one of:

an ascending or descending index based on data values associated with a measurement field represented by the plurality of documents, a compound index based on data values associated with a plurality of measurement fields represented by the plurality of documents, or an index relating to a portion of the stored plurality of timeseries events that meet a specified filter expression.

19. The non-transitory computer-readable medium according to claim 18, wherein the index is associated with the plurality of timeseries events based on time values.

* * * * *